United States Patent

Tashiro et al.

Patent Number: 5,394,954
Date of Patent: Mar. 7, 1995

[54] ENGINE CONTROL APPARATUS

[75] Inventors: Kenji Tashiro; Kimitoshi Murata; Akito Adachi, all of Toyota, Japan

[73] Assignee: Toyota Jidosha Kabushiki Kaisha, Toyota, Japan

[21] Appl. No.: 40,704

[22] Filed: Mar. 31, 1993

[30] Foreign Application Priority Data

Apr. 9, 1992 [JP] Japan ................................. 4-089071
Apr. 23, 1992 [JP] Japan ................................. 4-104808
Jul. 3, 1992 [JP] Japan ................................. 4-200328

[51] Int. Cl.⁶ ........................................... B60K 31/00
[52] U.S. Cl. ................................... 180/178; 180/179; 123/361
[58] Field of Search ............... 280/170, 176, 178, 179; 364/424.01, 426.01, 426.02, 426.03, 426.04; 123/352, 361

[56] References Cited

U.S. PATENT DOCUMENTS 4,951,208 8/1990 Etoh .................................. 364/426.04

FOREIGN PATENT DOCUMENTS 1167429 7/1989 Japan .
2124329 5/1990 Japan .

Primary Examiner—Richard M. Camby
Attorney, Agent, or Firm—Kenyon & Kenyon

[57] ABSTRACT

An engine control apparatus includes a first intake valve and a second intake valve provided along an intake passage. First and second actuators drive the respective throttle valves. A setting unit sets a vehicle target speed in the constant cruising speed control mode. A first control unit controls the first actuator so as to maintain the actual vehicle speed at the target speed during the constant cruising speed control mode. An angle sensor detects the angle of the first throttle valve. A mode memory stores information about a plurality of control modes to be used in controlling the second throttle valve. A mode selector selects one of the control modes. Each control mode stored in the mode memory defines the target angle of the second throttle valve that depends on the angle of the first throttle valve. In accordance with the control mode selected by the mode selector, a second control unit controls the second actuator in such a way that the angle of the second throttle valve becomes the target angle determined in accordance with the first throttle valve angle. The control apparatus includes a regulator unit for regulating the first and/or the second control units, so as to control the first throttle valve in accordance with the control mode specified for the constant cruising speed control mode, while the constant speed control mode is in progress.

11 Claims, 21 Drawing Sheets

ENGINE CONTROL APPARATUS

BACKGROUND OF THE INVENTION

1. Field of the Invention

The present invention generally relates to an engine equipped with two throttle valves along its air intake passage. More particularly, this invention relates to an engine control apparatus, which regulates one throttle valve to permit a vehicle to move at constant speed, even when the driver is not stepping on the accelerator pedal, and which regulate the other throttle valve in order to control the engine power.

2. Description of the Related Art

Japanese Unexamined Patent Publication No. 1-167429 discloses an engine having two throttle valves disposed along its air intake passage. The angle of the first throttle valve is mechanically controlled in relation to the amount of manipulation or thrusting of the accelerator pedal. The angle of the second throttle valve is controlled in relation to the amount of manipulation of the actuator. The conventional control apparatus disclosed in this publication adjusts the angle of the second throttle valve, in order to control the engine power. The control apparatus has characteristic control maps of different patterns to determine the second throttle valve angle as a function of the first throttle valve angle.

When the slip ratio, which is computed based on the numbers of rotations of the drive wheel and driven wheel, exceeds a predetermined value, or falls below it, the control apparatus refers to the engine power control maps to reduce the second throttle valve angle. As a result, the opening of the air intake passage at the second throttle valve is reduced, to prevent the wheels from slipping. Thereafter, the control apparatus sequentially changes control maps, in order to gradually to set the second throttle valve angle back to the original angle.

Japanese Unexamined Patent Publication No. 2-124329 also discloses an engine having two throttle valves disposed along its air intake passage. In this conventional embodiment, the first throttle valve is driven by the actuator as well as by the accelerator pedal. The control of the constant cruising speed of a vehicle is performed by controlling the first throttle valve angle, while the engine power is controlled by adjusting the second throttle valve angle.

However, the conventional control devices which select one of the different control modes (characteristic control maps), based on the second throttle valve angle that is associated with the first throttle valve angle, in order to control the second throttle valve, have the following shortcomings. If the first throttle valve is regulated to maintain the constant cruising speed of the vehicle, sufficient engine torque might not be reached at the time the vehicle is set in the constant cruising speed mode, thus causing the vehicle speed to exceed or not to reach the target value. This phenomenon will be referred to as "overshooting or under shooting the target valve. There are two possible causes for this phenomenon. One cause is that the first throttle valve angle that is required to maintain a specific constant speed varies with the different control modes. Another cause is that the conventional control devices do not take into consideration the control mode of the second throttle valve, in setting the initial angle of the first throttle valve, at the onset of the constant cruising speed mode.

The overshooting and undershooting phenomenon will be described in more detail referring to FIGS. 2 through 4.

The method for determining the angle of the second throttle valve will be explained using the graph in FIG. 2. FIG. 2 shows a two-coordinate system, where the abscissa represents the angle of the first throttle valve, and the ordinate represents the total equivalent throttle angle. The total equivalent throttle angle means the equivalent valve angle when the first and second throttle valves are replaced with a single throttle valve. Normally, the equivalent valve angle is closer to the smaller one of the two valve angles. For instance, when the first throttle valve angle is 20° and the second throttle valve angle is 50°, the total throttle equivalent angle is approximately 20°.

In the control mode (A) illustrated by the broken line in FIG. 2, the second throttle valve will have a smaller angle than that of the first throttle valve. In the control mode (B) illustrated by the solid line in FIG. 2, the second throttle valve angle is nearly proportional to the angle of the first throttle valve. Even if a certain total equivalent throttle angle were sought, the required angle of the first throttle valve varies with the control modes. For example, when the total equivalent throttle angle of x° is sought, the required first throttle valve angle is a° in the control mode (A), and b° in the control mode (B).

The relationship between the first throttle valve angle and the engine torque in individual control modes will now be explained using the graph in FIG. 3. FIG. 3 shows a two-dimensional coordinate system, where the abscissa represents the angle of the first throttle valve, and the ordinate represents the engine torque. The broken line in FIG. 3 represents the control mode (A) for the second throttle valve, and the solid line represents the control mode (B). If a certain engine torque were sought, the required first throttle valve angle varies with the control modes. For example, when the engine torque of "Q" is sought, the required first throttle valve angle is a° in control mode (A), and b° in control mode (B). The graph illustrates that the engine torque for the given first throttle valve angle differs with the control modes. For example, with the first throttle valve angle of x°, the engine torque is Qa in the control mode (A), and Qb (Qa<Qb) in the control mode (B).

A change in the vehicle speed at the time the constant cruising speed starts, will be described referring to FIGS. 4A through 4D. Each diagram includes a graph showing the relationship between time and the vehicle speed, and a graph showing the relationship between time and the manipulation amount of the actuator for driving the first throttle valve. The actuator manipulation amount means the angle by which the actuator rotates to control the first throttle valve angle to a predetermined valve. The actuator manipulation amounts A° and B° shown in these four diagrams respectively correspond to the first throttle valve angles a° and b° in FIG. 2.

In FIGS. 4A and 4B, the actuator manipulation amount for use in constant cruising speed is determined on the premise that the second throttle valve is always regulated in the control mode (A). In FIGS. 4C and 4D, the actuator manipulation amount is determined on the premise that the second throttle valve is always regulated in the control mode (B). In those four figures, it is assumed that the target value of the vehicle speed in the constant cruising speed is the same, and that the engine torque needed to keep the target vehicle speed is "Q", as indicated in FIG. 3.

FIG. 4B illustrates the case where the actuator manipulation amount (or the first throttle valve angle) is set on the premise that the second throttle valve is regulated in the control mode (A), and where the second throttle valve is actually regulated in this control mode (A). When the constant cruising speed is set at time t1, the control apparatus considers the vehicle speed at that time, as the target vehicle speed for the constant cruising speed. Further, the control apparatus sets the actuator manipulation amount to A°, in order to provide the first throttle valve angle a° needed to acquire a predetermined engine torque (Q) in the control mode (A). In this case, as the engine torque becomes "Q", no overshooting or undershooting of the vehicle speed occurs, and the real vehicle speed increases or decreases so as to stabilize at the target vehicle speed.

FIG. 4A illustrates the case where the actuator manipulation amount is set on the premise that the second throttle valve is regulated in the control mode (A), but the second throttle valve is actually controlled in control mode (B). After the constant cruising speed is set at time t1, the vehicle speed overshoots the target speed.

The conventional control devices do not account for the control mode of the second throttle valve, for controlling the constant cruising speed. Therefore, when the constant cruising speed is set at time t1, the initial actuator manipulation amount is set to A°, in order to set the engine torque to "Q", although the second throttle valve is actually controlled in the control mode (B). However, as the second throttle valve is actually controlled in the control mode (B), the engine torque becomes Qa', such that Qa' is greater than Q, as shown in FIG. 3. Thus, the real vehicle speed overshoots the target vehicle speed, and the actuator manipulation amount gradually decreases toward B° through a conventional constant cruising speed feedback system. As shown in FIG. 3, the actuator manipulation amount B° corresponds to the torque Q.

FIG. 4D illustrates the case where the actuator manipulation amount (or the first throttle valve angle) is set on the premise that the second throttle valve is regulated in the control mode (B), and where the second throttle valve is actually regulated in this control mode (B). When the constant cruising speed is set at time t1, the control apparatus considers the vehicle speed at that time as the target vehicle speed for the constant cruising speed. Further, the control apparatus sets the actuator manipulation amount to B°, to provide the first throttle valve angle b° that is needed for the engine to generate a predetermined engine torque (Q) in the control mode (B). In this case, as the engine torque actually becomes "Q", the real vehicle speed reaches the target vehicle speed, without overshooting or undershooting it.

FIG. 4C illustrates the case where the actuator manipulation amount is set on the premise that the second throttle valve is regulated in the control mode (B), but where the second throttle valve is actually regulated in the control mode (A). In this case, the vehicle speed undershoots the target speed, after the constant cruising speed is set at time t1.

As mentioned earlier, the conventional control devices do not take into consideration the control mode for the second throttle valve when controlling the constant cruising speed. Therefore, when the constant cruising speed is set at time t1, the initial actuator manipulation amount is set to B° to set the engine torque to "Q", although the second throttle valve is actually regulated in the control mode (A). However, the second throttle valve is actually regulated in the control mode (A), and, as shown in FIG. 3, the engine torque becomes Qb', which is smaller than Q. Thus, the real vehicle speed undershoots the target vehicle speed, and, as shown in FIG. 4C, the actuator manipulation amount gradually decreases after temporarily exceeding the predetermined valve, and converges toward A° through a conventional constant cruising speed feedback system. The actuator manipulation amount A° corresponds to the torque Q.

Briefly, the conventional methods do not attach significant importance to the control mode for the second throttle valve in regulating the constant cruising speed of the vehicle. In other words, the initial actuator manipulation amount (i.e., the initial first throttle valve angle) will always be accorded exclusive or higher priority in association with the selected control mode. When the actual initial manipulation amount differs from the initial manipulation amount, which corresponds to the control mode that is used in the constant cruising speed, the vehicle speed could overshoot or undershoot the target speed.

SUMMARY OF THE INVENTION

Accordingly, it is a primary objective of the present invention to provide an engine control apparatus which prevents or substantially minimizes the occurrence of the overshooting or undershooting phenomenon, regardless of the initial condition of the constant cruising speed starts.

To achieve the foregoing and other objects and in accordance with the purpose of the present invention, an improved engine control apparatus is provided for controlling the constant cruising speed of an vehicle. The vehicle includes a engine provided with an intake passage, and a driver-controlled speed accelerator mechanism.

The control apparatus includes a first throttle valve and a second throttle valve provided in series along the intake passage. The first throttle valve forms a first variable angle therewith, and the first angle is changeable by means of the speed accelerator mechanism. The second throttle valve forms a second variable angle therewith. The control apparatus includes a first actuator for controlling the first angle independently of the speed accelerator mechanism, and a second actuator for controlling the second angle.

The control apparatus includes a speed sensor for detecting the actual vehicle speed, a cruise control sensor for detecting the beginning and end of a constant cruising speed control mode, and a target speed setting unit for setting a vehicle target speed during the constant cruising speed control mode. The control apparatus further includes a control unit for controlling the first actuator, to maintain the actual vehicle speed at the target speed, during the constant cruising speed control mode.

The control apparatus includes an angle sensor for detecting the first angle, and a mode memory for storing information relating to a plurality of control modes for use in controlling the second throttle valve. Each of the control modes defines a target value for the second angle, as a function of the first angle. The control apparatus further includes a mode selector for selecting one of said control modes. The control unit further controls the second actuator, to cause the second angle to reach the target value according to the selected control mode.

The control apparatus further includes a regulator for regulating the control unit during the constant cruising speed control mode, in order to control the first throttle valve, according to a control mode which is specified for the constant cruising speed control mode, and which is selected among the stored control modes.

It is preferable that the control mode specified for the constant cruising speed control mode is predetermined, and is not subject to the mode selection of the mode selector. It is also preferable that the regulator is connected to the mode selector. Then, the regulator may regulate the control unit, in such a way that the control mode specified for the constant cruising speed control mode is similar to the control mode selected by the mode selector.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments, together with the accompanying drawings, in which:

FIG. 4A' shows a graph illustrating operation of a system in which an amount of manipulation of the actuator is set based on the premise that the second throttle valve is regulated in the control mode (A), but wherein the second throttle valve is actually regulated in the control mode (B), the graph shows changes in an amount of manipulation of the actuator with respect to time after the vehicle speed has been set;

FIG. 4B' shows a graph illustrating operation of a system in which an amount of manipulation of the actuator is set based on the premise that the second throttle valve is regulated in the control mode (A) and wherein the second throttle valve is actually regulated in the control mode (A), the graph shows changes in an amount of manipulation of the actuator with respect to time after the vehicle speed has been set;

FIG. 4C' shows a graph illustrating operation of a system in which an amount of manipulation of the actuator is set based on the premise that the second throttle valve is regulated in the control mode (B), but wherein the second throttle valve is actually regulated in the control mode (A), the graph shows changes in an amount of manipulation of the actuator with respect to time after the vehicle speed has been set;

FIG. 4D' shows a graph illustrating operation of a system in which an amount of manipulation of the actuator is set based on the premise that the second throttle valve is regulated in the control mode (B) and wherein the second throttle valve is actually regulated in the control mode (B), the graph shows changes in an amount of manipulation of the actuator with respect to time after the vehicle speed has been set;

FIGS. 7 through 9 illustrate a second embodiment of the engine control apparatus according to the present invention, in which:

FIG. 7 is a block diagram of an engine control apparatus according to the second embodiment;

FIG. 8 is a flowchart illustrating a control routine for a first throttle valve used in the engine control apparatus according to the second embodiment;

FIG. 9 is a flowchart illustrating a control routine for a second throttle valve used in this control apparatus;

FIGS. 10 through 14 illustrate a third embodiment of the engine control apparatus according to the present invention, in which:

FIG. 10 is a block diagram of an engine control apparatus according to the third embodiment;

FIG. 11 is a perspective exploded view of a link mechanism that couples a first throttle valve to an accelerator pedal;

FIG. 13 is a flowchart illustrating a control routine for the first throttle valve;

FIG. 14 is a flowchart illustrating a control routine for the second throttle valve;

FIGS. 16 through 20 illustrate a fifth embodiment of the engine control apparatus according to the present invention, in which:

FIG. 16 is a block diagram of an engine control apparatus according to the fifth embodiment;

FIG. 17 is a graph showing the relationship between the passage opening at a first throttle valve and the engine torque;

FIG. 18 is a flowchart illustrating a gain setting routine;

FIG. 19 is a flowchart illustrating a routine for use in constant cruising speed control for the first throttle valve;

FIG. 20 includes three graphs showing the relationships between time and various control parameters;

DETAILED DESCRIPTION OF THE PREFERRED EMBODIMENTS

The six embodiments according to the present invention will be described below.

First Embodiment

Figure 1:
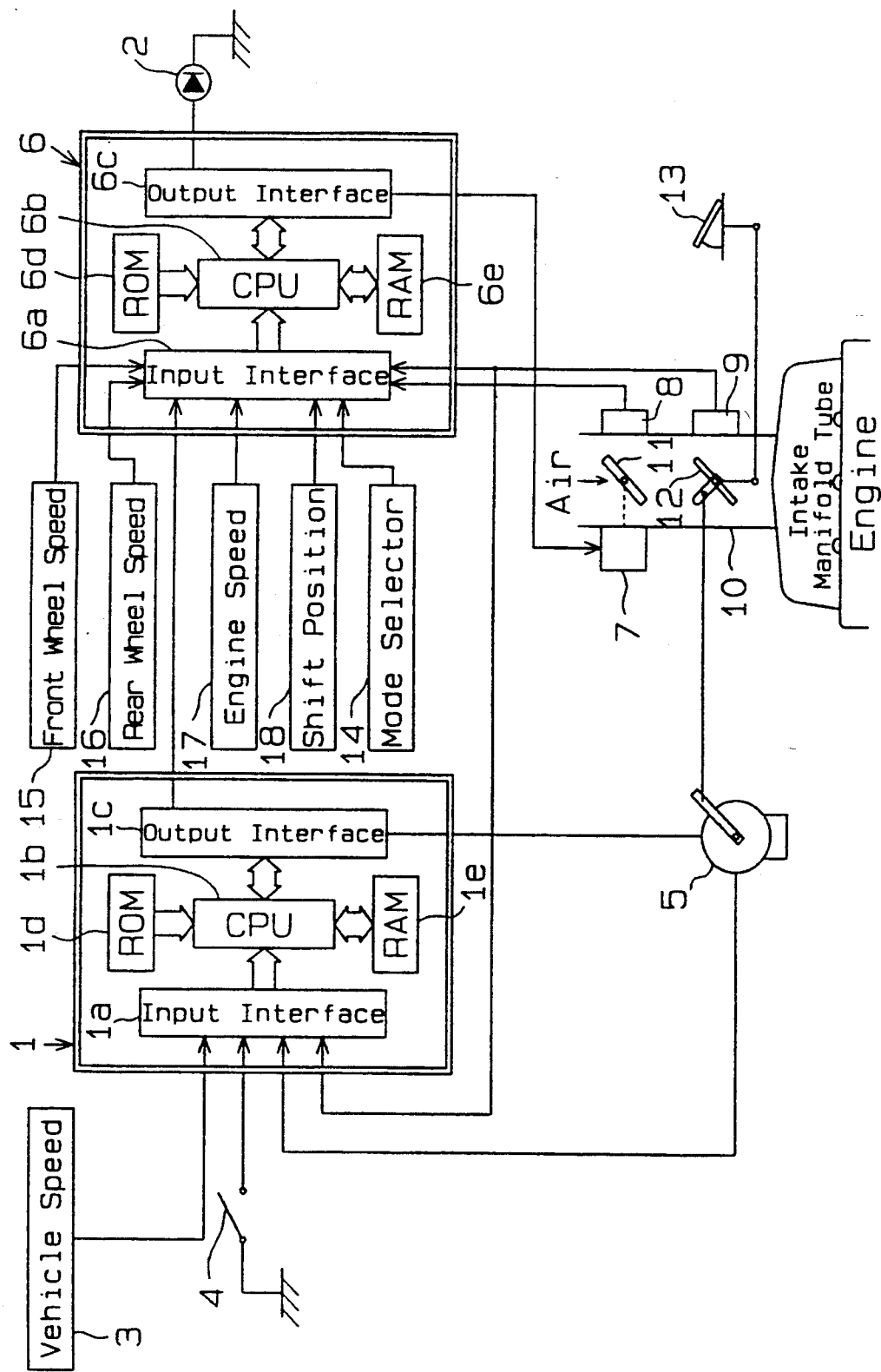
FIG. 1 is a block diagram of an engine control apparatus according to a first embodiment of the present invention.

The first embodiment of the present invention will now be described referring to FIGS. 1, 2, 3, 5 and 6. FIG. 1 is a block diagram representation of an engine control apparatus according to the first embodiment. A first throttle valve 12 and a second throttle valve 11 are provided in series of an air intake passage 10, which is connected, via the intake manifold tubes, to an engine. The first throttle valve 12 is coupled, via a link mechanism, to an accelerator pedal 13 and an actuator 5, in order to regulate the constant speed cruising control operation. The second throttle valve 11 is coupled to a throttle motor 7 which may be a stepping motor or an ordinary electric motor. Two valve angle sensors 8 and 9 are located near the air intake passage 10. The first valve angle sensor 9 detects the angle of the first throttle valve 12, and the second valve angle sensor 8 detects the angle of the second throttle valve 11.

The control apparatus includes a first control unit which controls the constant cruising speed of the vehicle, and a second control unit 6 which mainly controls the engine power.

The first control unit 1 includes a central processing unit (CPU) 1b, an input interface circuit 1a and an output interface circuit 1c. The input interface circuit 1a converts the input signals from external sources to the CPU 1b into digital signals. The output interface circuit 1c converts output signals from the CPU 1b into analog signals, as needed. The first control unit 1 further includes a read only memory (ROM) 1d where control programs and initial setting data are stored, and a random access memory (RAM) 1e for temporary storage of the input data to the control unit 1, and other data that is necessary for carrying out computing operations.

The input interface circuit 1a is connected to a vehicle speed sensor 3 for detecting the vehicle speed, a speed setting switch 4, the actuator 5 and the first valve angle sensor 9. The setting switch 4 is used to instruct the first control unit 1 of the start of the cruising control operation, and to set a target value for the vehicle speed. The output interface circuit 1c is connected to the actuator 5 and to the second control unit.

The actuator 5 is controlled by an output signal from the first control unit 1, to allow the vehicle to maintain the target vehicle speed. The first throttle valve 12 is regulated by the actuator 5 and the accelerator pedal 13.

Although the angle of the throttle valve 12 varies with the magnitude of thrust on the accelerator pedal 13, control by the actuator 5 is usually given priority. However, when the angle of the first throttle valve set by the accelerator pedal 13 exceeds the valve angle set by the actuator 5, control by the accelerator pedal 13 is given by priority over the actuator 5.

The second control unit 6, which controls the engine power, comprises a central processing unit (CPU) 6b, an input interface circuit 6a, an output interface circuit 6c, a read only memory (ROM) 6d and a random access memory (RAM) 6e. The input and output interface circuits 6a and 6c, and the ROM and RAM memories 6d and 6e operate in the same manner as the corresponding components of the first control unit 1.

The input interface circuit 6a is connected to the output interface circuit 1c of the first control unit 1, such that the second control unit 6 receives a signal from the first control unit 1, which indicates whether or not the first control unit 1 is executing a cruising control operation. The input interface circuit 6a is further connected to a front wheel sensor 15, for detecting the speed of a front wheel; to a rear wheel sensor 16, for detecting the speed of a rear wheel; to an engine speed sensor 17; to a shift position sensor 18, for detecting the shift position of a transmission mechanism; to a control mode selector 14; to the first valve angle sensor 9; and to the second valve angle sensor 8. The mode selector 14 indicates the throttle valve control mode selected by the driver, for the second control unit 6.

The output interface circuit 6c is connected to the throttle motor 7, and to an indicator 2 which indicates the selected control mode. As a result, the throttle motor 7 is controlled by a control signal from the second control unit 6.

The control signal from the first control unit 1 to the actuator 5 takes the form of a pulse signal having a duty (D) as given by the following equation (1). The forward/reverse rotation of the actuator 5 is determined by the polarity of the current that flows in the actuator 5.

$$D = C'(MAn - An) \tag{1}$$

In this equation (1), "An" is the current actuator manipulation amount, "MAn" is the target value for the actuator manipulation amount, and "C'" is a compensation coefficient. The target value (MAn) is computed from the following equations (2) and (3):

$$MAn = SA + G(Vt - Vsk) + C \tag{2}$$

$$Vsk = Vn + \Delta t (dv/dt) \tag{3}$$

In equation (2), "SA" is the actuator manipulation amount which is necessary for the vehicle to move on a horizontal road surface, at a given speed, and is the initial angle in the cruising control operation. "Vt" is the target vehicle speed. "Vsk" is the vehicle speed for spark-advance control operation, that is estimated based on the real vehicle speed (Vn). "(Vt−Vsk)" represents the vehicle speed difference. "G" is the control gain, and "C" is a compensation coefficient. In equation (3), "Δt" indicates a predetermined time interval. "dv/dt" is the acceleration or differential of the real vehicle speed. In equation (2), Vsk can be replaced with the real vehicle speed (Vn).

Figure 2:
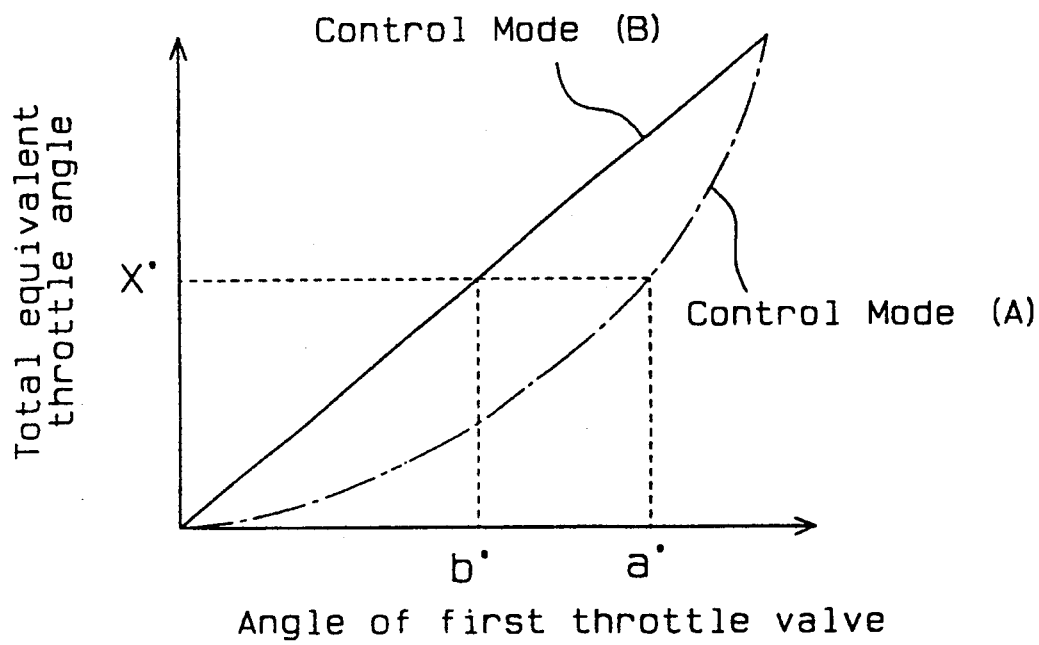
FIG. 2 is a graph showing the relationship between the angle of a first throttle valve and a total throttle equivalent angle.
Figure 3:
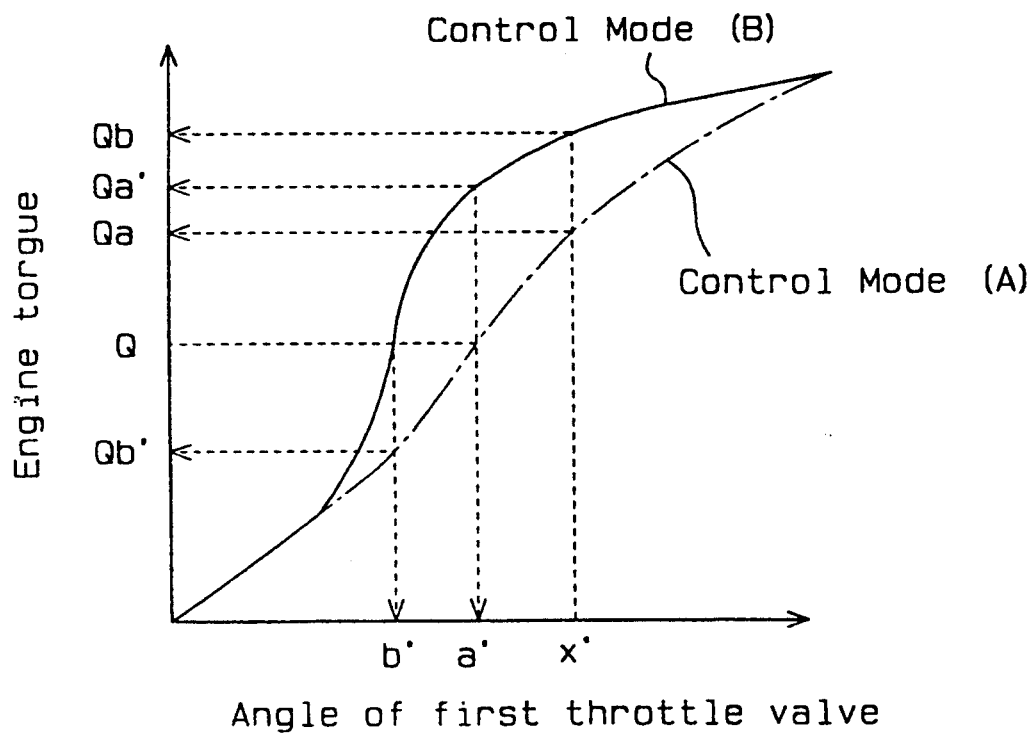
FIG. 3 is a graph showing the relationship between the first throttle valve angle and the engine torque.
Figure 4A:
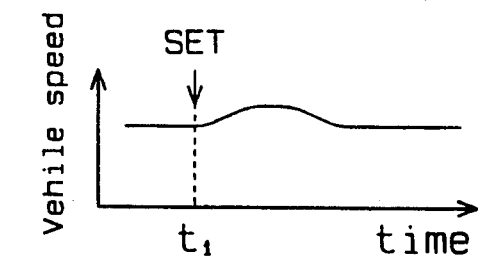
FIG. 4A shows a graph illustrating operation of a system in which an amount of manipulation of the actuator is set based on the premise that the second throttle valve is regulated in the control mode (A), but wherein the second throttle valve is actually regulated in the control mode (B), the graph shows changes in vehicle speed with respect to time after the vehicle speed has been set.
Figure 4A:
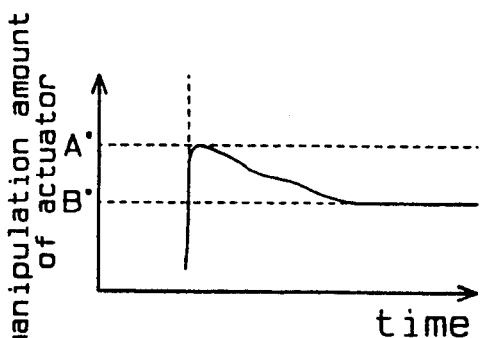
Figure 4B:
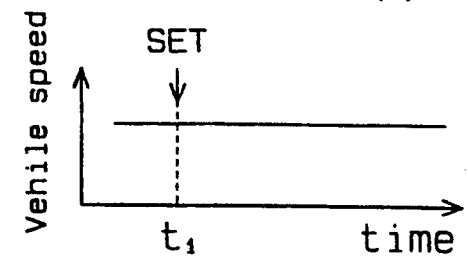
FIG. 4B shows a graph illustrating operation of a system in which an amount of manipulation of the actuator is set based on the premise that the second throttle valve is regulated in the control mode (A) and wherein the second throttle valve is actually regulated in the control mode (A), the graph shows changes in vehicle speed with respect to time after the vehicle speed has been set.
Figure 4B:
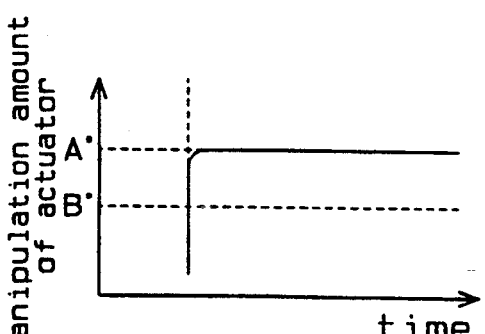
Figure 4C:
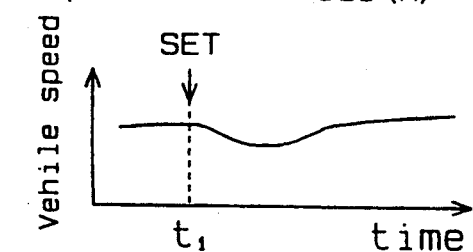
FIG. 4C shows a graph illustrating operation of a system in which an amount of manipulation of the actuator is set based on the premise that the second throttle valve is regulated in the control mode (B), but wherein the second throttle valve is actually regulated in the control mode (A), the graph shows changes in vehicle speed with respect to time after the vehicle speed has been set.
Figure 4C:
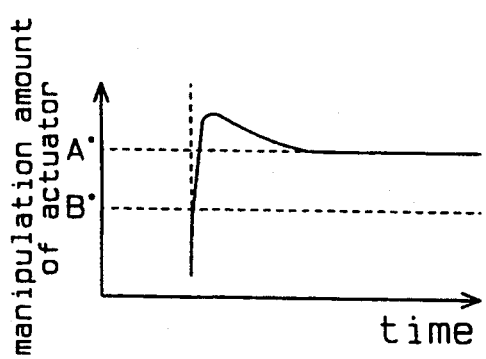
Figure 4D:
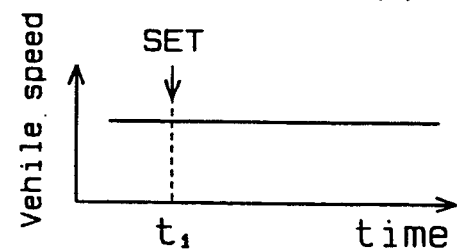
FIG. 4D shows a graph illustrating operation of a system in which an amount of manipulation of the actuator is set based on the premise that the second throttle valve is regulated in the control mode (B) and wherein the second throttle valve is actually regulated in the control mode (B), the graph shows changes in vehicle speed with respect to time after the vehicle speed has been set.
Figure 4D:
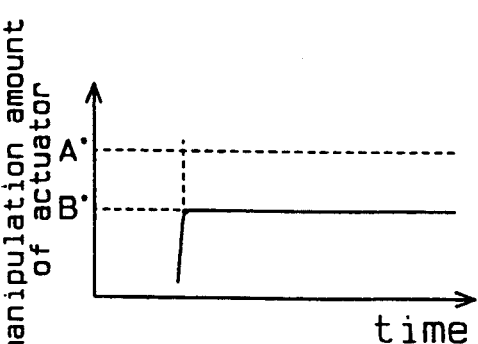

The control apparatus according to the first embodiment has two control modes (A) and (B), as shown in FIG. 2.

Figure 5:
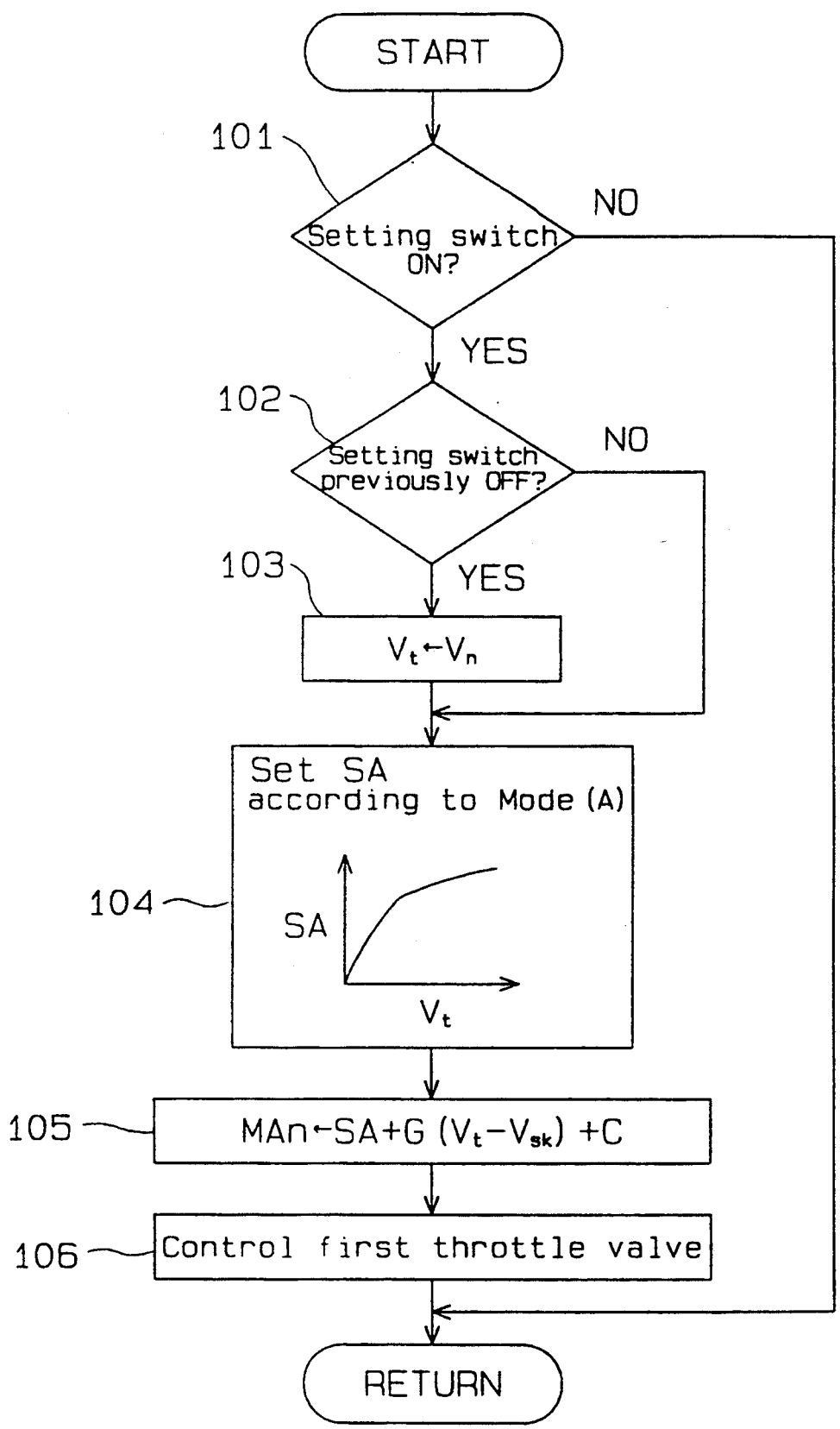
FIG. 5 is a flowchart illustrating a control routine for the first throttle valve used in the control apparatus according to the first embodiment.

FIG. 5 illustrates an interrupt routine for setting the first throttle valve 12 to the target actuator manipulation amount (MAn). This routine is periodically executed by the CPU 1b of the first control unit 1.

First, the CPU 1b determines if the setting switch 4 is ON (step 101). If so, the CPU 1b determines whether or not the previous setting of the setting switch 4 was OFF (step 102). If it was, that is if speed cruising control operation has started, the CPU 1b sets the current real vehicle speed (Vn) as the target vehicle speed (Vt) (step 103). From this target vehicle speed (Vt), the CPU 1b determines the actuator manipulation amount SA (reference amount) that is necessary for the vehicle to move on a horizontal road surface at the vehicle speed (Vt) (step 104).

The control mode of the second throttle valve at constant cruising speed is forcibly set to the mode (A) shown in FIG. 2. Thus, the relationship between the first throttle valve angle and engine torque is specifically determined by the mode (A). It is therefore sufficient to experimentally determine the correlation between the target vehicle speed (Vt) and the actuator manipulation amount (SA), based on mode (A), and to store this correlation in the ROM 1d. In step 104, the actuator manipulation amount (SA) is acquired from the stored correlation.

Thereafter, the CPU 1b calculates the target value (MAn), based on the actuator manipulation amount (SA) from equation (2) (step 105). The CPU 1b outputs a valve control instruction to the actuator 5, to set the actual actuator manipulation amount to the target value (MAn) (step 106). When the setting switch 4 is OFF in step 101, the CPU 1b does not perform the control operation based on this control routine. When the previous setting of the switch 4 is ON, step 102, it means that the cruising control operation has continued. Thus, the CPU 1b executes the control routine starting at step 104, without setting the target vehicle speed at step 103.

When the control by this routine is released, the first throttle valve 12 will no longer be controlled by the actuator 5, but is exclusively controlled by the accelerator pedal 13.

Figure 6:
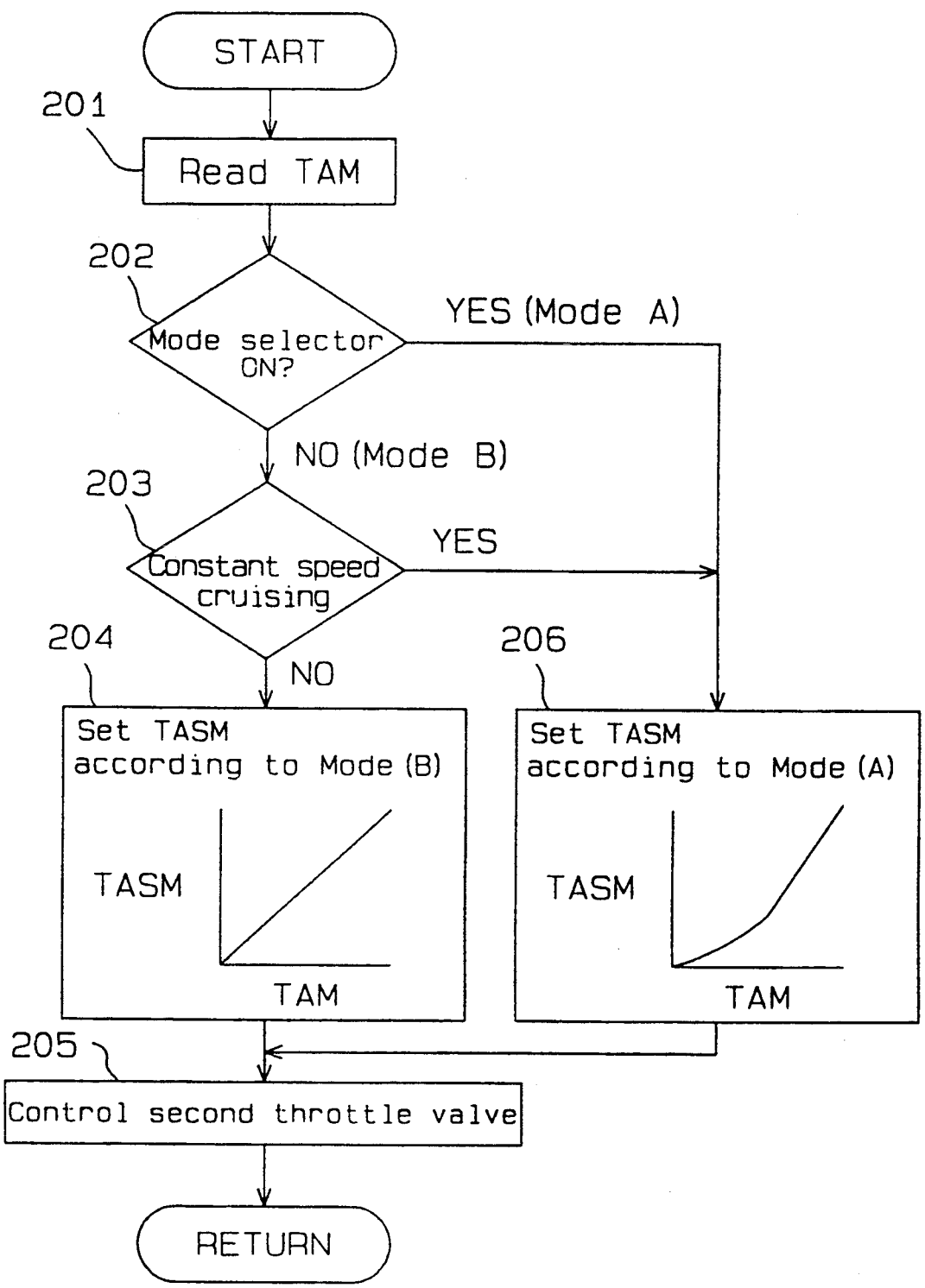
FIG. 6 is a flowchart illustrating a control routine for a second throttle valve used in this first embodiment.

FIG. 6 illustrates an interrupt routine for controlling the second throttle valve 11. This routine is periodically executed by the CPU 6b of the second control unit 6.

The CPU 6b reads the first throttle valve angle (TAM) from the first valve angle sensor 9 (step 201). Then, the CPU 6b determines which control mode is selected by the mode selector 14 (step 202). In this embodiment, the mode selector 14 is an ON/OFF switch, which selects the mode (A) when it is ON, and the mode (B) when it is OFF. The mode selector 14 can be other than an ON/OFF switch.

When the mode selector 14 is OFF (mode B), the CPU 6b determines, from the status of the setting switch 4 indicated by the first control unit 1, whether or not the constant cruising speed control operation is in progress (step 203). If the vehicle is not moving at constant speed, the CPU 6b determines the target angle of the second throttle valve, TASM, based on the function between the first throttle valve angle (TAM) and the target second throttle valve angle (TASM), according to mode (B) (step 204).

When the mode selector 14 is ON (mode A), step 202, or when the vehicle is at constant cruising speed, step 203, the CPU 6b advances to step 206 where the CPU 6b determines the target angle for the second throttle valve (TASM), based on the relationship between TAM and TASM, according to mode (A).

Thereafter, the CPU 6b controls the second throttle valve 11 through the throttle motor 7, in such a way that the angle of the second throttle valve becomes the target angle (TASM) obtained in step 204 or step 206 (step 205).

As described above, the second throttle valve will have an angle according to the angle of the first throttle valve. Regardless of which mode, mode (A) or mode (B), has been selected in normal cruising (other than the constant speed cruising), the control mode of the second throttle valve will always be set to mode (A), in the constant cruising speed control operation. Thus, the initial actuator manipulation amount based on mode (A) will be set, and the second throttle valve will have an angle according to the first throttle valve angle. As a result, the vehicle speed is prevented from overshooting or undershooting the target speed, even when the constant vehicle speed is set.

At steps 204 and 206, the selected mode is indicated by the indicator 2. Even when the mode for the constant cruising speed operation differs from the mode for the normal cruising operation, the driver can determine the current control mode so that the driver does not feel uncomfortable by the change in acceleration resulting from the over-riding phenomenon.

Second Embodiment

Figure 7:
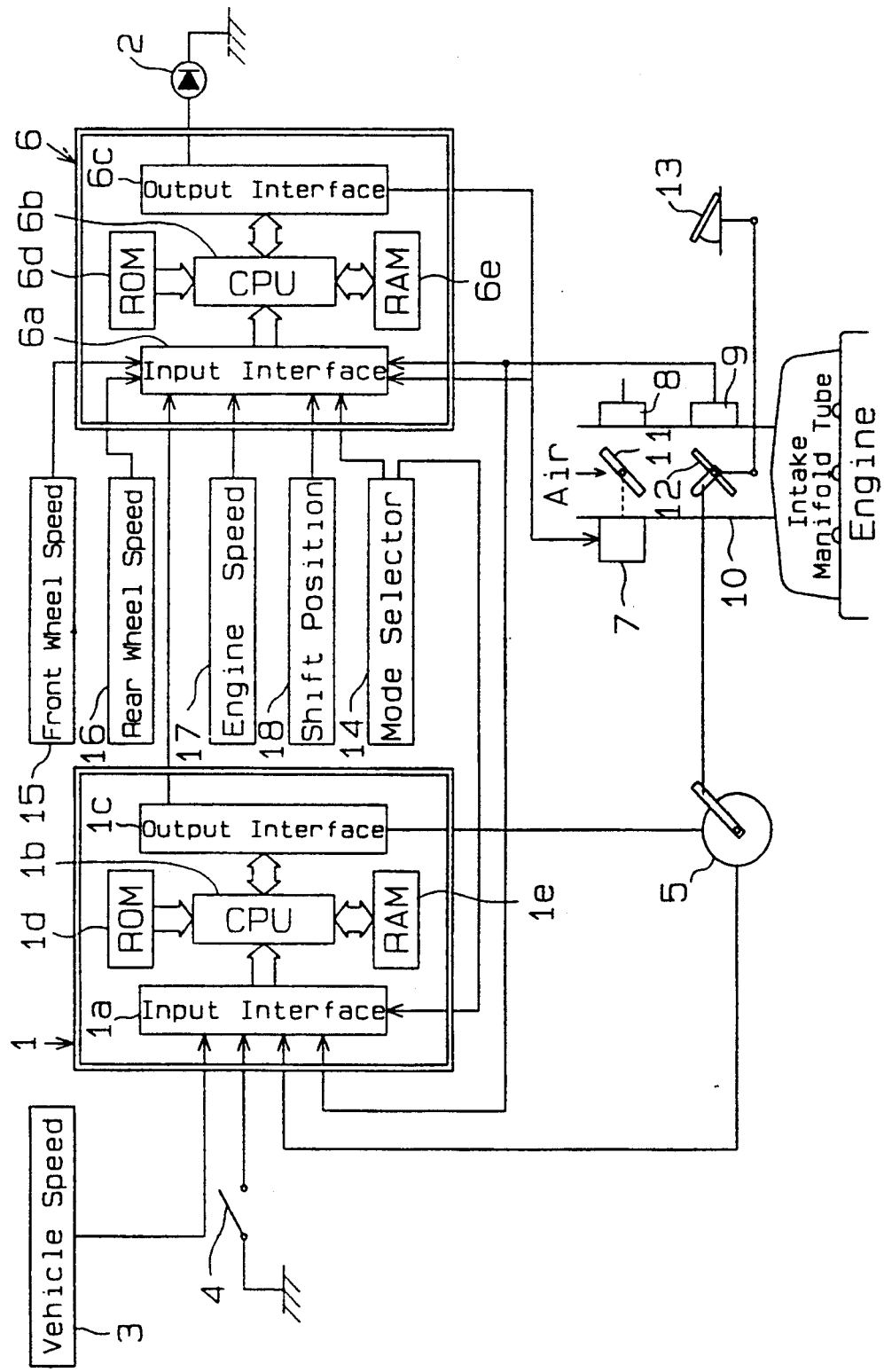
Figure 8:
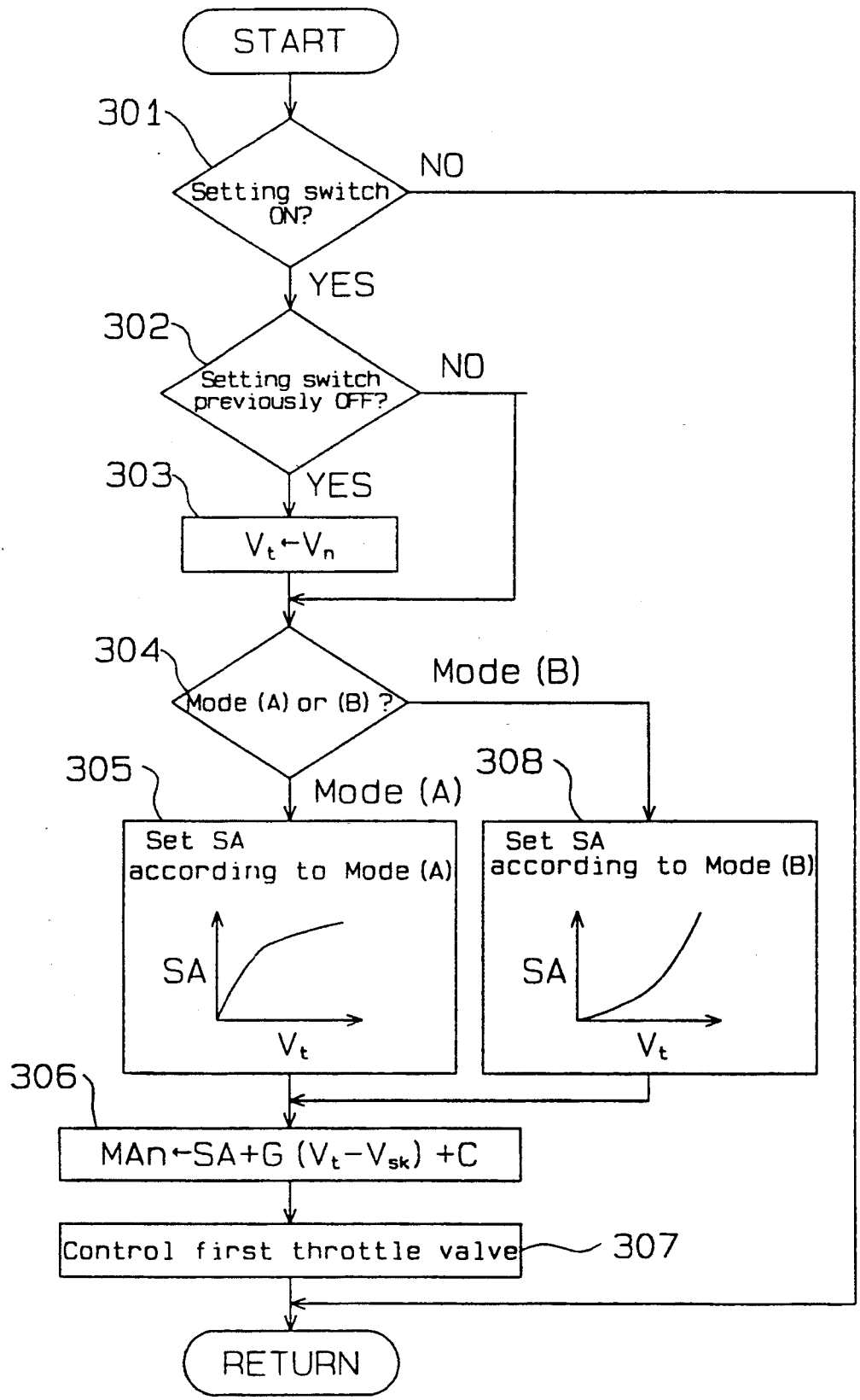
Figure 9:
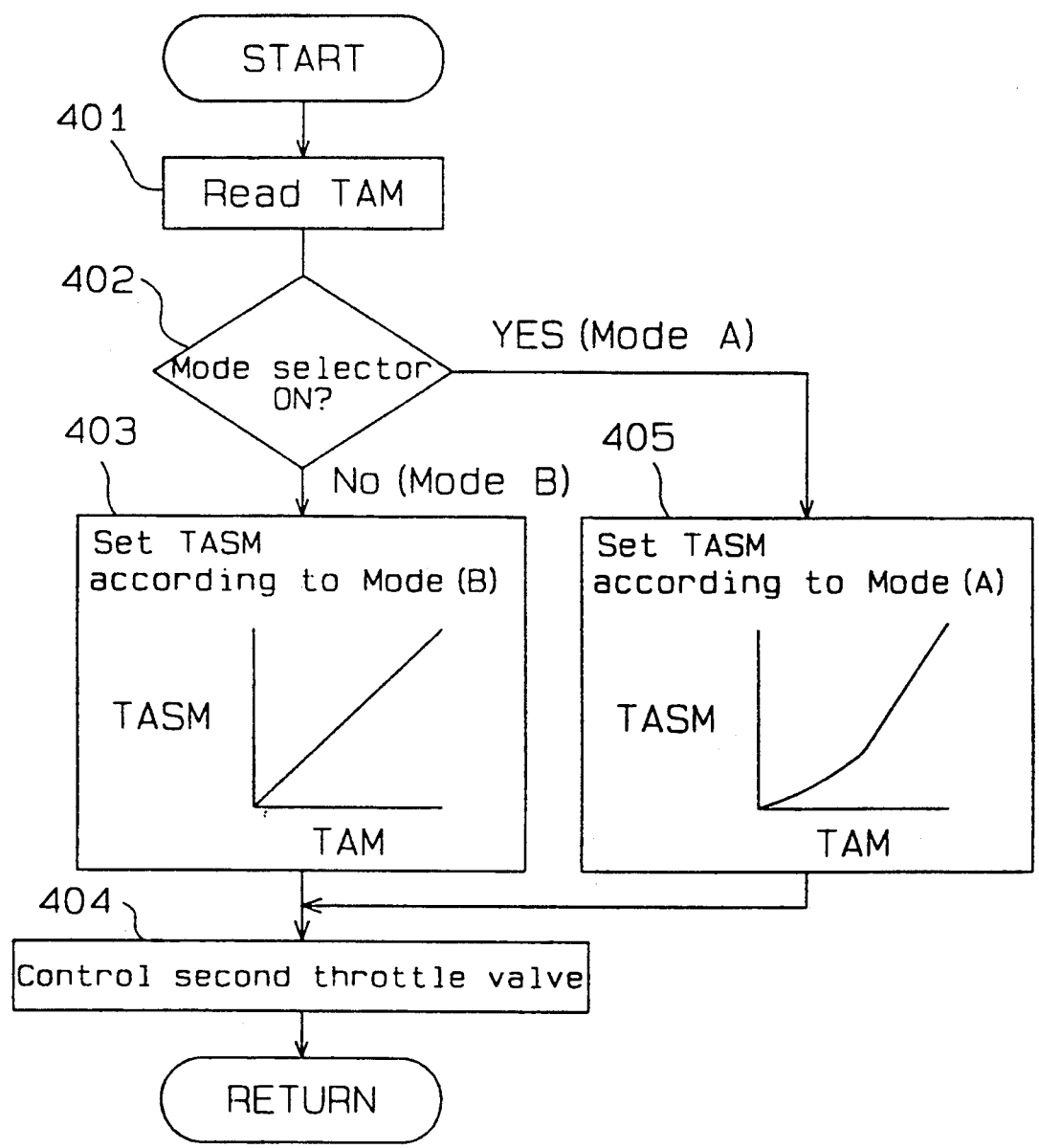

Referring now to FIGS. 7, 8 and 9, the second embodiment of the present invention will be described. The structure of the control apparatus according to this embodiment is illustrated in FIG. 7. The structure is substantially similar to that of the first embodiment, except that the mode selector 14 is also connected to the input interface circuit 1a of the first control unit 1. The throttle control characteristics in the second embodiment are the same as those (see FIGS. 2 and 3) in the first embodiment. The main difference from the first embodiment is in the control routines illustrated in FIGS. 8 and 9.

FIG. 8 illustrates an interrupt routine for controlling the angle of the first throttle valve 12 relative to the target actuator manipulation amount (MAn), during constant cruising speed operation. This routine is periodically executed by the CPU 1b of the first control unit 1.

First, the CPU 1b determines if the setting switch 4 is ON (step 301). If so, then the constant cruising speed control operation has been initiated, the CPU 1b determines whether or not the setting of the switch 4 in the previous setting discrimination is OFF (step 302). When the previous setting of the switch 4 is OFF (which means that the constant cruising speed control operation has been initiated), the CPU 1b considers the current real vehicle speed (Vn) as the target vehicle speed (Vt) (step 303).

Following step 303, or when the previous setting of the switch 4 is ON, the CPU 1b determines the selected control mode in accordance with the status of the mode selector 14 (step 304). The mode selector 14 is an ON/OFF switch, which specifies the mode (A) when it is ON and the mode (B) when it is OFF.

The CPU 1b then determines the initial actuator manipulation amount (SA) necessary for the vehicle to move at the target vehicle speed (Vt) (step 305 or 308).

In the second embodiment, unlike in the first embodiment, the control mode of the second throttle valve during the constant cruising speed control operation, can be either the mode (A) or mode (B), as shown in FIG. 2. In either mode, the relationship between the first throttle valve angle and engine torque is specifically determined. It is therefore sufficient to experimentally determine the relationship between the target vehicle speed (Vt) and the actuator manipulation amount (SA) for each control mode, and to store this relationship in the ROM 1d. At steps 305 and 308, the actuator manipulation amount (SA) is determined from the stored correlation.

Then, the CPU 1b calculates the target value (MAn) of the actuator manipulation amount (SA), based on the amount (SA) and the equation (1) (step 306). The CPU 1b outputs a valve control instruction to the actuator 5, to set the actual actuator manipulation amount to the target value (MAn) (step 307). When the setting switch 4 is OFF, at step 301, the CPU 1b does not execute this control routine.

When the setting switch 4 in the previous control is ON at step 302, it means that the constant cruising speed control operation has continued. Thus, the CPU 1b executes step 304, without setting the target vehicle speed at in step 303.

When this routine is released, the first throttle valve 12 will no longer be controlled by the actuator 5, but rather exclusively by the accelerator pedal 13.

FIG. 9 illustrates an interrupt routine for controlling the second throttle valve 11. This routine is periodically executed by the CPU 6b of the second control unit 6.

The CPU 6b determines the first throttle valve angle (TAM) from the first valve angle sensor 9 (step 401). Then, the CPU 6b determines which control mode is selected by the mode selector 14 (step 402). When the mode selector 14 is OFF (mode B), the CPU 6b determines the target angle of the second throttle valve (TASM), referring to the graph showing the relationship between TAM and TASM in mode (B) (step 403). When the mode selector 14 is ON (mode A) at step 402, the CPU 6b acquires the target second throttle valve angle (TASM), referring to the map that shows the relationship between TAM and TASM in mode (A).

Thereafter, the CPU 6b controls the second throttle valve 11 through the throttle motor 7, in such a way that the second throttle valve angle becomes the target angle (TASM) obtained in step 403 or step 405 (step 404).

As described above, the angle of the second throttle valve will be determined according to the angle of the first throttle valve. Regardless of the selected mode, i.e. mode (A) or mode (B), for normal cruising conditions (other than the constant speed cruising), the control mode of the second throttle valve is during the constant speed cruising control operation. The initial actuator manipulation amount (i.e., the first throttle valve angle) will be set based on the confirmed control mode, and the angle of the second throttle valve will be determined according to the first throttle valve angle. As a result, the vehicle speed is prevented from overshooting or undershooting, at the time the vehicle cruising speed is set.

There may be three or more patterns for the control mode of the second throttle valve in the first and second embodiments. While the first and second control units 1 and 6 are provided separately, they may be designed into a single control unit having only one CPU.

Third Embodiment

Figure 10:
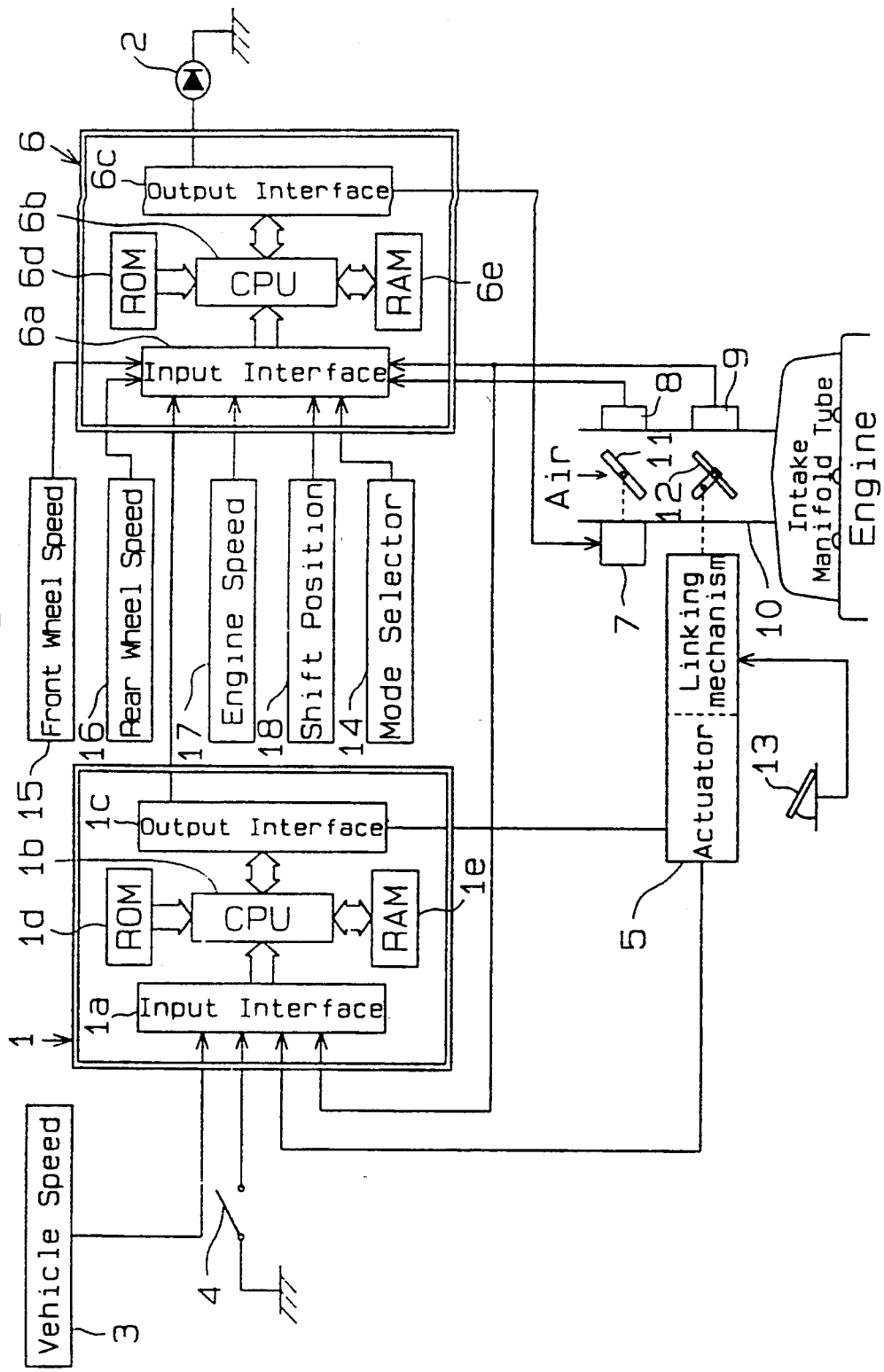

Referring now to FIGS. 10 through 14, the third embodiment of the present invention will be described. FIG. 10 illustrates the control apparatus according to this embodiment. The structure is substantially the same as that of the first embodiment. In the ROM 6d of the second control unit 6, two patterns for the second throttle valve (mode A and mode B) are stored as in the first embodiment. The first valve angle sensor 9 outputs an idling contact signal to the first control unit 1. The idling contact signal becomes enabled (ON) when the first throttle valve 12 is closed completely, and becomes disabled (OFF) otherwise.

Figure 11:
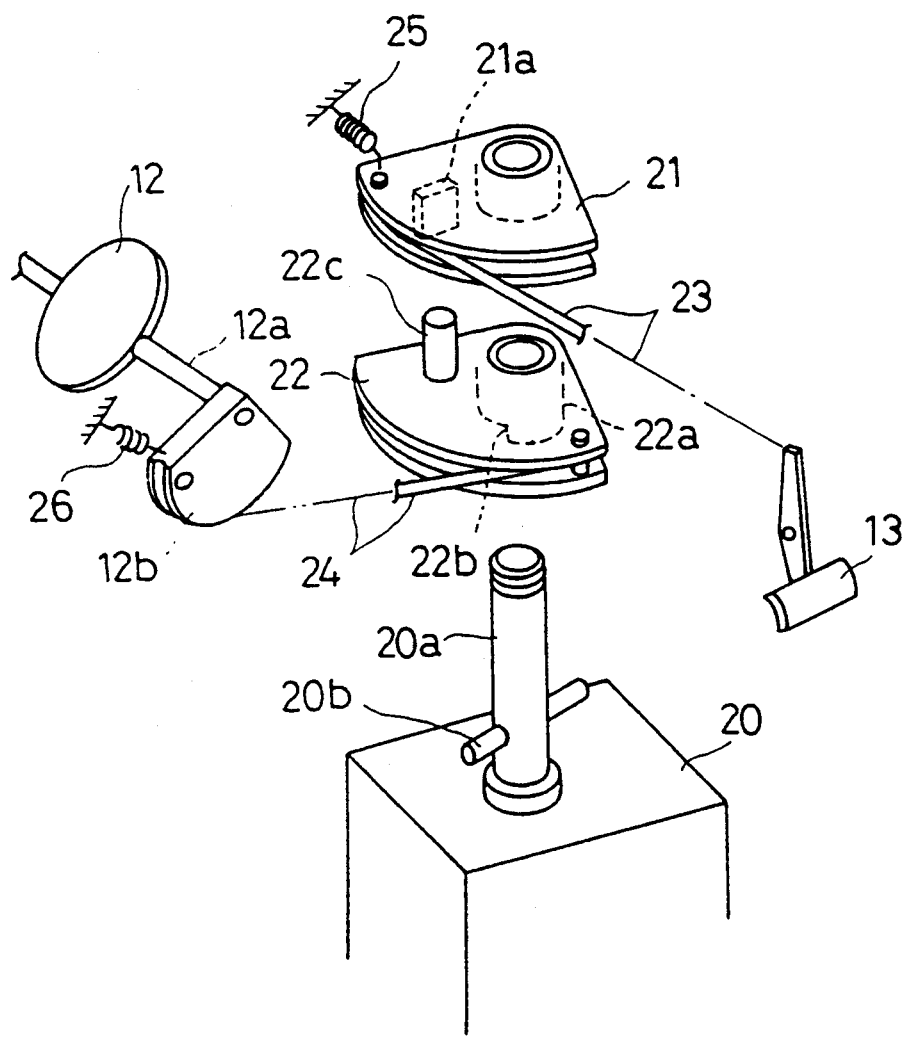

The actuator 5 for the constant cruising speed control and the first throttle valve 12 are connected by a link mechanism shown in FIG. 11. The link mechanism will be described in more detail. As shown in FIG. 11, the first throttle valve 12 is provided with a pivot 12a at the end of which a throttle pulley 12b is attached. The actuator 5 includes a servo-motor 20 to be controlled by signals from the first control unit 1. A pair of pins 20b are provided on a drive shaft 20a of the servo-motor 20. The rotational angle of the drive shaft 20a is converted into voltage by a potentiometer (not shown) incorporated in the servo-motor 20. A signal reflective of the voltage value is outputted to the first control unit 1. In this embodiment, the drive angle of the servo-motor 20 is equivalent to the "actuator manipulation amount".

The link mechanism includes upper and lower pulleys 21 and 22 which are rotatably fitted over the drive shaft 20a. The lower pulley 22 has a boss portion 22a formed at the bottom thereof. The boss portion 22a has a step 22b engageable with the pins 20b. The lower pulley 22 also has a protrusion 22c formed on the top. The upper pulley 21 has a protrusion 21a formed at the bottom for contacting the protrusion 22c. The upper pulley 21 is connected, via a wire 23, to the accelerator pedal 13, and is urged clockwise by a return spring 25. The lower pulley 22 is connected, via a wire 24, to the throttle pulley 12b, which is urged by a return spring 26 in the direction to close the throttle valve 12. As the return springs 25 and 26 always apply tension to the wires 23 and 24, the wires 23 and 24 will not be loosened by the clockwise or counterclockwise rotation of the upper and lower pulleys 21 and 22.

When the constant cruising speed control is not set, the upper pulley 21 rotates counterclockwise in response to the thrusting of the accelerator pedal 13. At this time, the lower pulley 22 also rotates counterclockwise due to the engagement of the upper protrusion 21a with the lower protrusion 22c, such that the angle of the first throttle valve is adjusted. When the thrusting force on the accelerator pedal 13 is removed, the upper pulley 21 rotates clockwise under the force of the return spring 25. As the lower pulley 22 is permitted to rotate clockwise by the returning motion of the upper pulley 21 to its original position, the first throttle valve 12 is caused to close under the action of the return spring 26.

When the constant cruising speed control is set, the servomotor 20 is driven to rotate the drive shaft 20a counterclockwise, so as to achieve a predetermined vehicle speed. At this time, the lower pulley 22 rotates together with the drive shaft 20a, due to the engagement of the pins 20b with the step 22b. The angle of the first throttle valve 12 is thus controlled in accordance with the amount of rotation of the drive shaft 20a. Under constant cruising speed conditions, the counterclockwise rotation of the lower pulley 22 will not be restricted at all by the upper pulley 21.

With the use of this link mechanism, when a driver wishes the vehicle speed to exceed the target vehicle speed set in constant cruising speed mode, the driver simply needs to apply an additional thrust force on the accelerator pedal 13. In which case, the upper pulley 21 further rotates the lower pulley 22 counterclockwise, regardless of the angular position of the drive shaft 20a, thus causing the first throttle valve 12 to open further. To further widen the first throttle valve angle by thrusting the accelerator pedal during constant cruising speed mode, is called "over-riding".

Two methods for detecting whether or not the vehicle is in over-riding mode will now be described. The first method uses the actuator manipulation amount and the idling contact signal. The vehicle is determined to be in the over-riding mode, when the first throttle valve 12 is not closed completely (i.e. idling contact=OFF), although the actuator manipulation amount has reached to or below the level, for completely closing the air intake passage at the first throttle valve.

The second method uses the actuator manipulation amount, the acceleration of the vehicle and the idling contact signal. The vehicle will be determined to be in the over-riding mode, when at least the following two conditions are met: (1) the actuator manipulation amount has dropped to, or below the level required for the vehicle to move on a horizontal road surface, at the target vehicle speed; and (2) the acceleration of the vehicle having reached, or exceeded the level which cannot be achieved during the cruising control operation. But, those two conditions may also occur when the vehicle drives down a steep road during constant cruising speed control. To determine the over-riding state, therefore, the third condition, such that the idling contact is OFF (which means that the driver is thrusting the accelerator pedal) is needed.

The first method or detection scheme will be described in more detail referring to FIGS. 12A to 12E.

Figure 12A:
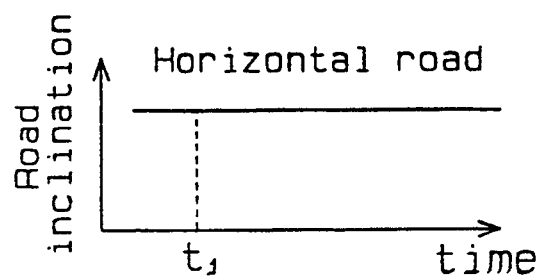
FIGS. 12A to 12J are graphs showing the relationships between time and various control parameters, and explaining how to discriminate the over-riding condition.
Figure 12B:
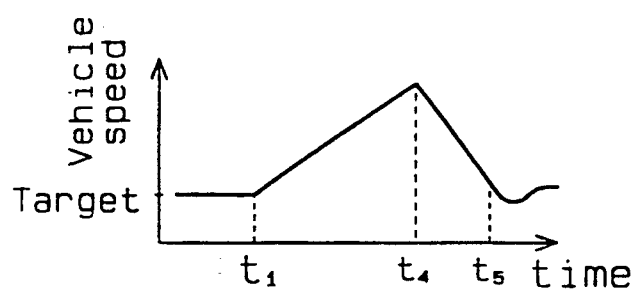

Assume that the driver has applied an additional force on the accelerator pedal 13, to accelerate the vehicle at time t1, while driving on a horizontal road surface, as shown in FIG. 12A in a constant cruising speed control mode. Since the lower pulley 22 is located at a certain angular position by the servo-motor 20, the upper protrusion 21a will not contact the lower protrusion 22c when the pedal is thrusted slightly. When the accelerator pedal 13 is thrust with a significant force, the upper protrusion 21a will contact the lower protrusion 22c, and will cause the protrusion 22c to rotate counterclockwise. As a result, the angle of the throttle valve 12 becomes wider, and increases the vehicle speed as shown in FIG. 12B.

Figure 12C:
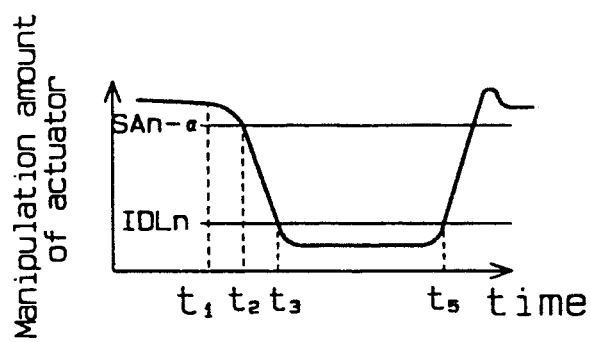

During a normal cruising control operation, the vehicle speed is fed back to set the real vehicle speed to the target level. As the vehicle speed increases, therefore, the actuator manipulation amount decreases as shown in FIG. 12C. FIG. 12C shows that at time t3, the actuator manipulation amount becomes below IDLn (at which level the actuator 5 makes the passage opening amount at the first throttle valve zero), and the idling contact is OFF (which means that the passage opening at the first throttle valve is not completely closed). At time t3, therefore, the vehicle is determined to be in the over-riding mode. At this time t3, the control mode of the second throttle valve 11 is switched from the control mode which has been used in the cruising control mode, to the normal cruising mode (the latter mode is selected by the mode selector 14). This will be described in more details later.

Figure 12D:
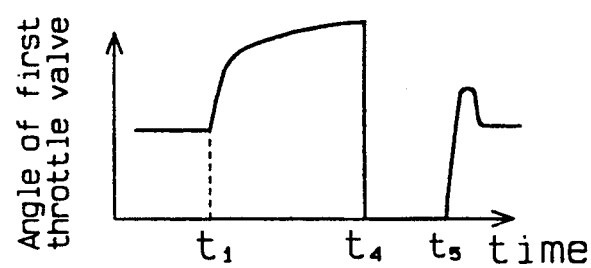
Figure 12E:
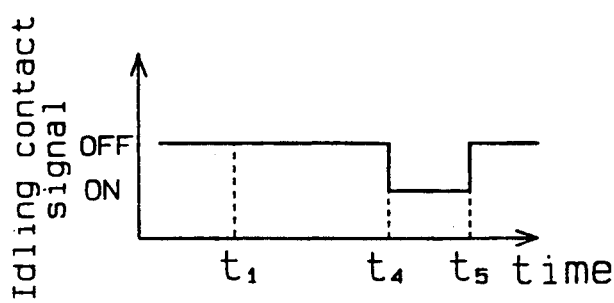
Figure 12F:
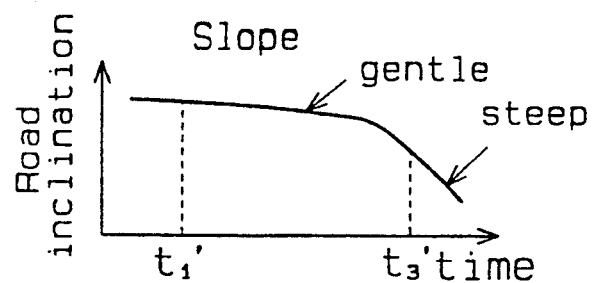
Figure 12G:
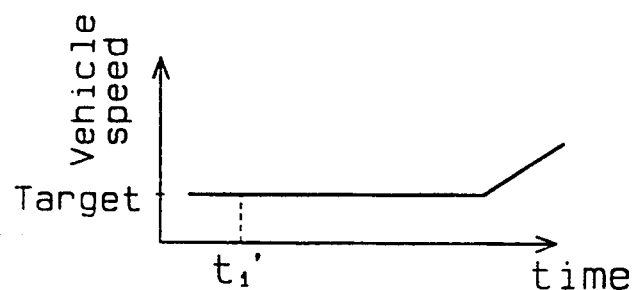
Figure 12H:
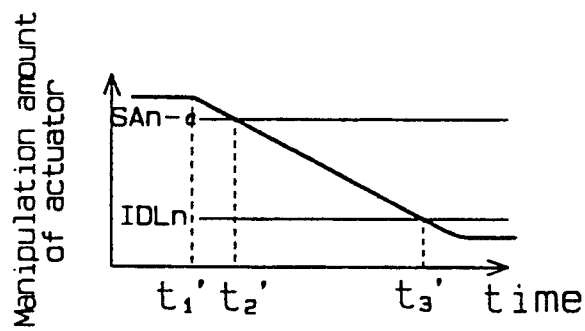
Figure 12I:
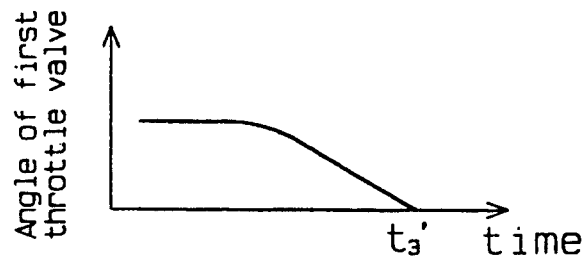
Figure 12J:
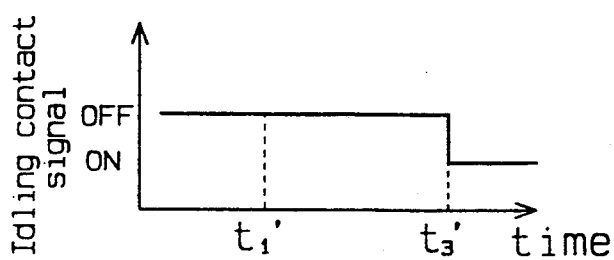

When the vehicle speed has increased too much, and the driver steps off the accelerator pedal 13 at time t4, the first throttle valve angle becomes zero as shown in FIG. 12D, and the status of the idling contact signal is switched from OFF to ON as shown in FIG. 12E. Since the vehicle is not in the over-riding mode in a predetermined period after t4, the control mode of the second throttle valve is switched from the control mode which has been used in normal cruising, to the one used in the constant cruising speed control mode.

As the real vehicle speed is higher than the target vehicle speed during that predetermined period after t4, the idling contact signal resumes the ON state and the first throttle valve angle is kept at zero. The actuator manipulation amount gradually increases from the point immediately before time t5 at which the real vehicle speed is lower than the target vehicle speed. At time t5, the actuator manipulation amount exceeds IDLn and the status of the idling contact signal is changed to OFF from ON. Further, as the actuator manipulation amount increases, the first throttle valve angle increases. It is apparent from FIG. 12B that although the vehicle speed is lower than the target vehicle speed during a short period after passage of time t5, the vehicle speed quickly converges to the target vehicle speed.

The following is a more detailed description of the second method or detection scheme.

When the over-riding mode starts at time t1, the actuator manipulation amount becomes smaller than $(SAn-\alpha)$ at time t2, as shown in FIG. 12C. Here, "SAn" is the actuator manipulation amount necessary for the vehicle to move on a horizontal road surface at a constant speed, and "$\alpha$" is the value of an over-riding detection offset. During constant cruising speed control, the vehicle speed is kept constant, even when the vehicle is descending a sloped surface. Accordingly, the target vehicle speed will not accelerate.

In the over-riding mode, however, the vehicle is accelerated. It is therefore possible to detect the over-riding mode, when the real vehicle acceleration (AC) is found to be as greater than a predetermined acceleration ($\beta$), as a result of comparing the acceleration (AC) and the acceleration ($\beta$).

However, the actuator manipulation amount can become lower than $(SAn-\alpha)$, and the acceleration (AC) can become larger than the predetermined acceleration ($\beta$), while the vehicle is moving downward on a steep slope. This should not necessarily mean over-riding. To prevent an erroneous detection of an over-riding mode, the status of the idling contact should be checked. In this respect, it is considered as over-riding, when the idling contact signal is OFF and the acceleration (AC) is greater than the predetermined acceleration ($\beta$) (which means that the driver is thrusting the accelerator pedal). When the vehicle is determined to be in the over-riding mode, the control mode of the second throttle valve 11 is changed from the mode which is used in the constant speed cruising control mode, to the one which has been used during normal cruising. The subsequent operation is the same as that of the first scheme. It is to be understood from the above that the second scheme determines the actuator manipulation amount during a quicker time period than the first scheme, thus ensuring quicker detection of the over-riding mode.

FIGS. 12F to 12J illustrate the case where the vehicle travels down on a slope at a constant speed, without over-riding. When the vehicle starts descending at time t1' during the constant cruising speed control mode, the vehicle speed generally increases. But, the actuator manipulation amount gradually decreases by the constant cruising speed control, keeping the vehicle speed at a constant level. Although the vehicle speed is constant from time t2', when the actuator manipulation amount becomes smaller than (SAn−α), until time t3' when the actuator manipulation amount becomes smaller than IDLn, the reduction of the actuator manipulation amount continues. Even if the over-riding is detected at this time, the state of the vehicle is not determined as over-riding because the vehicle acceleration (AC) is zero.

When the actuator manipulation amount becomes smaller than IDLn at time t3', the status of the idling contact signal is changed to ON from OFF. Following t3', the first throttle valve 12 cannot be closed, so that the vehicle speed increases although the constant cruising speed control is in progress. At this time, although the actuator manipulation amount is smaller than (SAn−α) and the acceleration (AC) is greater than (β), the idling contact signal is in an ON state, such that the state of the vehicle is not determined as over-riding.

The action of the control apparatus according to the third embodiment will be explained referring to the flowcharts shown in FIGS. 13 and 14. The over-riding detection procedures which will be discussed below, are carried out in the same manner as those of the first detection scheme described earlier.

Figure 13:
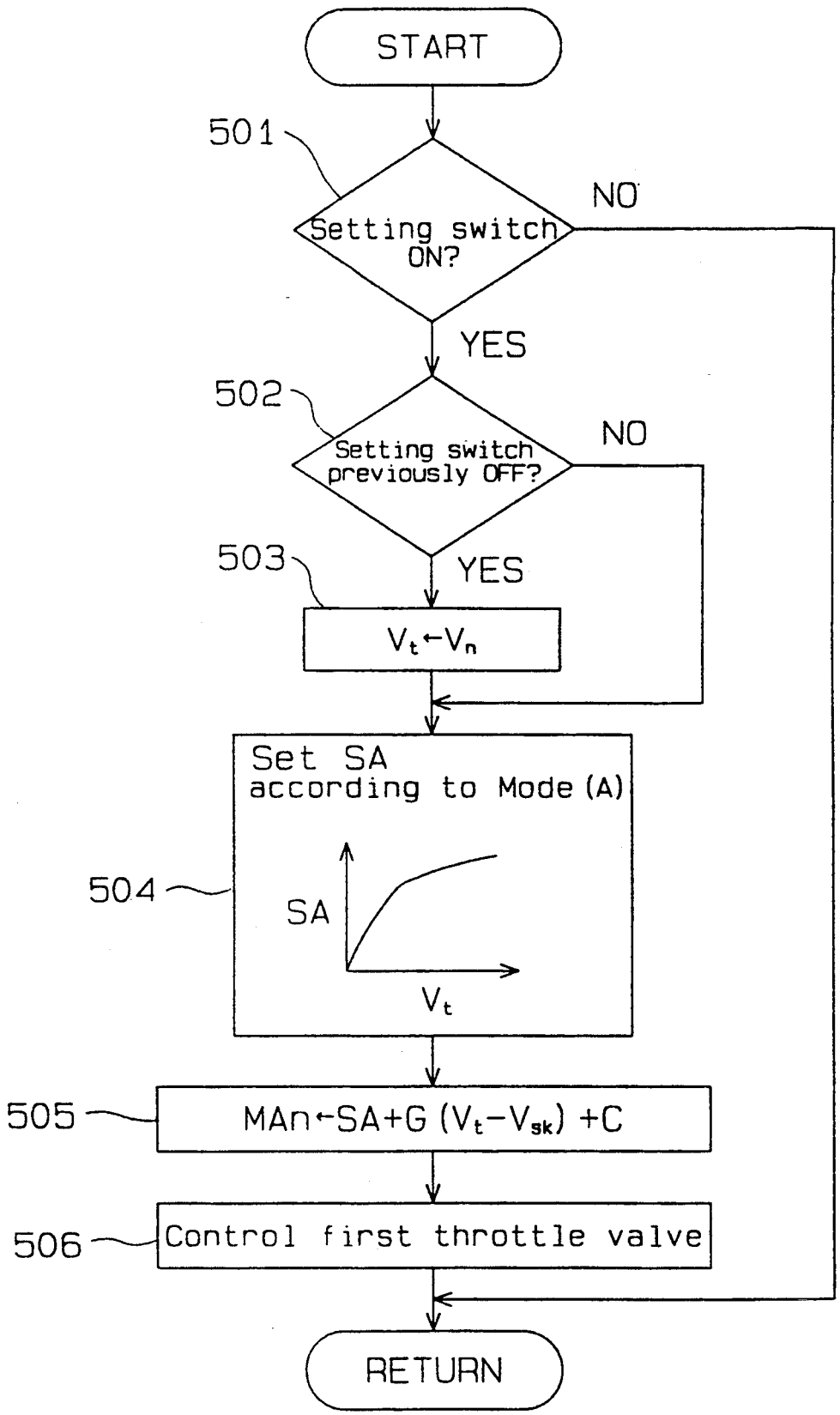

FIG. 13 illustrates an interrupt routine for bringing the first throttle valve 12 to the target actuator manipulation amount (MAn). This control according to this routine is periodically executed by the CPU 1b of the first control unit 1.

First, the CPU 1b determines if the setting switch 4 is ON (step 501). When the switch 4 is ON, the CPU 1b determines whether or not the setting of the switch 4 in the previous determination has been OFF (step 502). If so, this means that the constant speed cruising control mode has been initiated), the CPU 1b reads the current real vehicle speed (Vn) as the target vehicle speed (Vt) (step 503). Based on the target vehicle speed (Vt), the CPU 1b then acquires an actuator manipulation amount (SA) (reference amount) necessary for the vehicle to move on a horizontal road surface at the speed (Vt) (step 504).

The control mode of the second throttle valve during the constant cruising speed mode is forcibly set to the mode (A) shown in FIG. 2. Thus, the relationship between the first throttle valve angle and the engine torque is specifically determined in accordance with the mode (A). It is therefore sufficient to experimentally determine the relationship between the target vehicle speed (Vt) and the actuator manipulation amount (SA), based on the mode (A), and to store this relationship in the ROM 1d. At step 504, the actuator manipulation amount (SA) is obtained from the stored information.

The CPU 1b calculates the target value (MAn) based on the actuator manipulation amount (SA) from equation (2) (step 505). Then, the CPU 1b outputs a valve control instruction to the actuator 5, to set the actual actuator manipulation amount to the target value (MAn) (step 506). When the setting switch 4 is OFF, at step 501, the CPU 1b does not perform control based on this control routine. When the setting switch 4 in the previous control is ON, at step 502, this means that the constant cruising speed control has continued. Thus, the CPU 1b executes step 504, without setting the target vehicle speed at step 503.

When the control by this routine is completed, the first throttle valve 12 will no longer be controlled by the actuator 5, but rather exclusively by the accelerator pedal 13.

Figure 14:
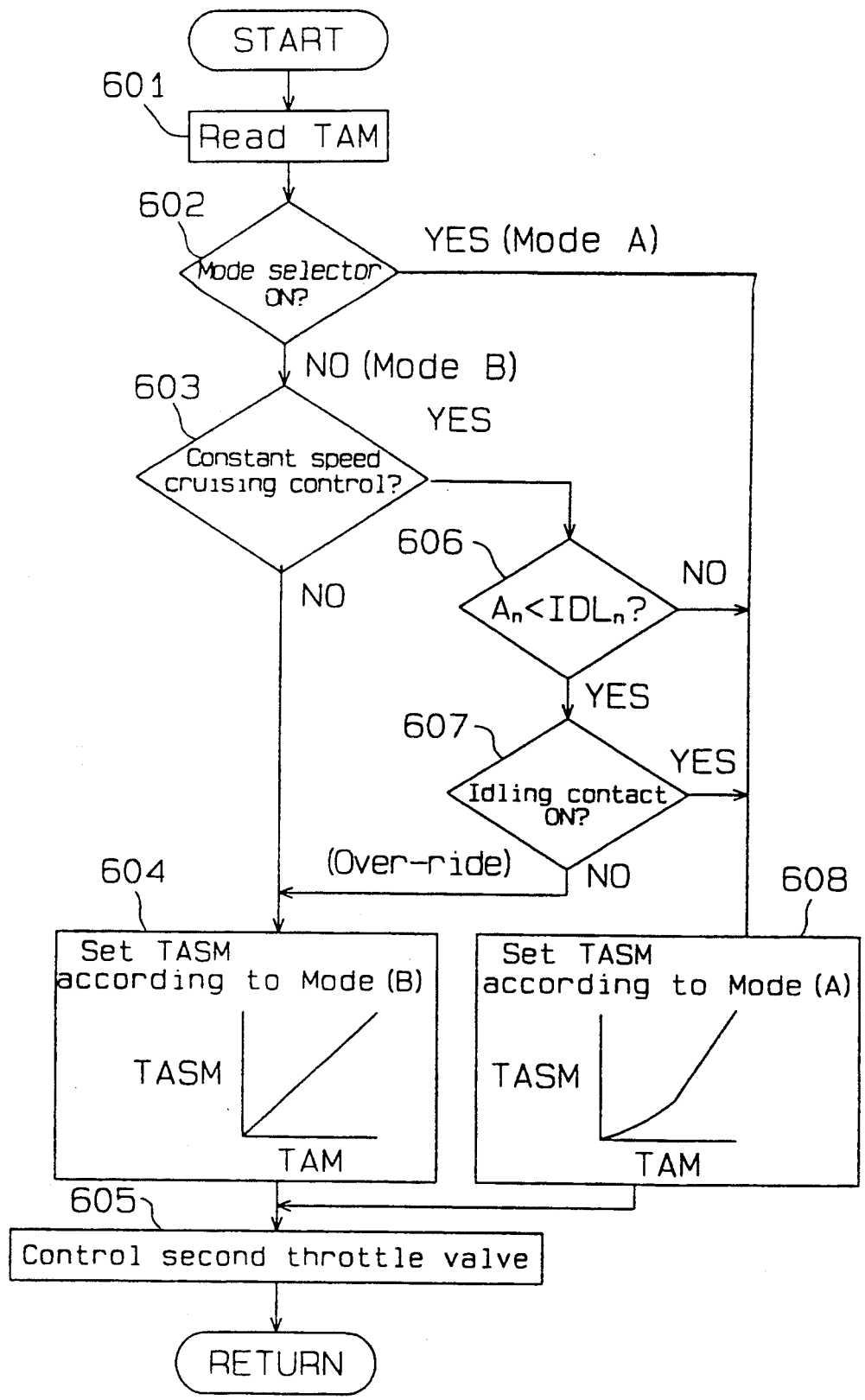

FIG. 14 illustrates an interrupt routine for controlling the second throttle valve 11. This routine is periodically executed by the CPU 6b of the second control unit 6.

The CPU 6b reads the first throttle valve angle (TAM) from the first valve angle sensor 9 (step 601). Then, the CPU 6b determines which control mode is selected by the mode selector 14 (step 602). In this embodiment, the mode selector 14 is an ON/OFF switch, which indicates the mode (A) when it is ON and indicates the mode (B) when it is OFF. The mode selector 14 can alternatively be of another type.

When the mode selector 14 is OFF (mode B), the CPU 6b determines, from the status of the setting switch 4 indicated by the first control unit 1, whether or not the constant cruising speed control is in progress (step 603). If the vehicle is not moving at a constant speed, the CPU 6b obtains the target angle of the second throttle valve (TASM), based on the relationship between TAM and TASM, according to the mode (B) (step 604). When the mode selector 14 is ON (i.e. mode A), at step 602, the CPU 6b obtains the target angle of the second throttle valve (TASM), based on the relationship between TAM and TASM, according to mode (A) (step 608).

When it is determined in step 603 that the constant cruising speed control is in progress, the CPU 6b determines if the actuator manipulation amount (An) is below IDLn, which is the actuator manipulation amount when the idling contact is switched to OFF from ON (i.e., when the air intake passage at the first throttle valve is not completely closed) (step 606). If the actual actuator manipulation amount (An) is below IDLn and the accelerator pedal is not being thrust, it means that the actuator 5 is not actually driving the first throttle valve 12.

When the amount (An) is smaller than IDLn, the CPU 6b determines whether or not the status of the idling contact signal from the first valve angle sensor 9 is ON (step 607). When the status of the idling contact signal is OFF, the CPU 6b determines that the vehicle is currently in the over-riding mode, because it satisfies the two conditions of: (i) the amount (An) being below IDLn; and (ii) the idling contact signal having an OFF status. The CPU 6b then acquires the target angle of the second throttle valve (TASM) in step 604. When the amount (An) is at least IDLn at step 606, or when the status of the idling contact signal is ON at step 607, the CPU 6b obtains the target angle (TASM) at step 608.

Thereafter, the CPU 6b controls the second throttle valve 11 through the throttle motor 7, in such a way that the second throttle valve angle becomes the target angle (TASM) obtained in step 604 or step 608 (step 605).

As described above, regardless of the mode (A or B) which has been selected for normal cruising (other than the constant cruising speed), the control mode of the second throttle valve is always set to mode (A) in the constant cruising speed control mode. If over-riding is detected when mode (B) is selected by the driver, the control mode of the second throttle valve is changed to the mode (B), even in the constant cruising speed control mode. In other words, when the driver applies a significant thrust force to the accelerator pedal during the constant cruising speed control mode, the control on the throttle valve is carried out in mode (B) originally desired by the driver, not in mode (A) which has been selected for the constant cruising speed control mode. The driver can therefore experience the acceleration feeling in the over-riding mode, without feeling startled.

If the throttle valve control in the over-riding mode is executed based on mode (A) even when the driver has selected mode (B), the driver would be annoyed by the acceleration feeling in the over-riding mode. This is because the driver would think that the vehicle were running in control mode (B) which would provide large engine torque, and he would thus expect quick acceleration. The third embodiment, like the first embodiment, prevents the vehicle speed from overshooting or undershooting at the time the vehicle speed is set.

Fourth Embodiment

Figure 15:
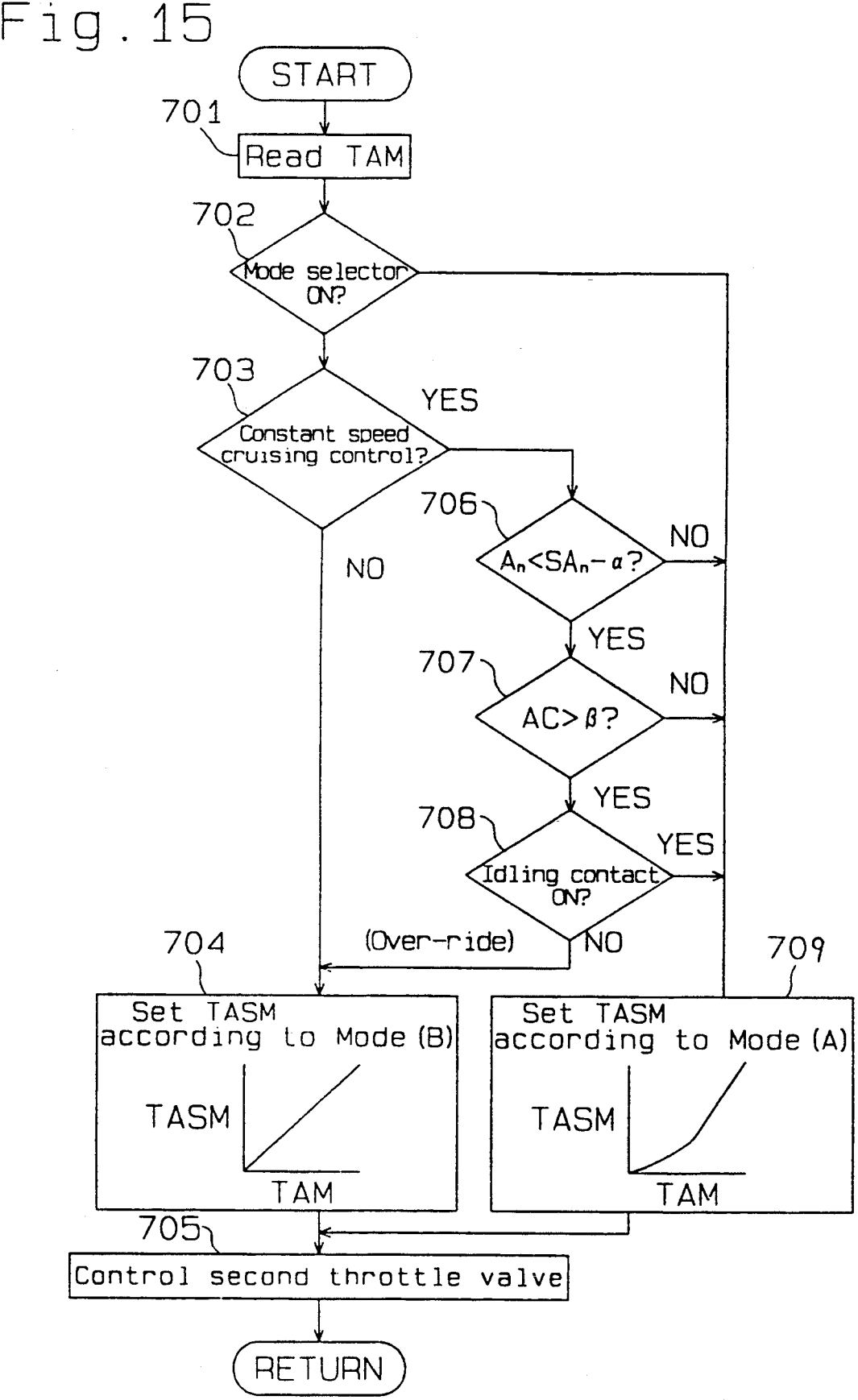
FIG. 15 is a flowchart illustrating a control routine for a second throttle valve used in an engine control apparatus according to a fourth embodiment of the present invention.

The fourth embodiment will be described referring to FIG. 15. The fourth embodiment has a similar design as the third embodiment. Since the above-described second over-riding detection scheme is employed in the fourth embodiment, this embodiment differs from the third embodiment in an interrupt routine for controlling the second throttle valve 11, as shown in FIG. 15. Only the interrupt processing illustrated in FIG. 15, which is periodically executed by the CPU 6b of the second control unit 6, will be described.

The CPU 6b reads the angle of the first throttle valve (TAM) from the first valve angle sensor 9 (step 701). Then, the CPU 6b determines which control mode is selected by the mode selector 14 (step 702). The mode selector 14 indicates the mode (A) when it is ON, and indicates the mode (B) when it is OFF.

When the mode selector 14 is OFF (mode B), the CPU 6b determines, from the status of the setting switch 4 indicated by the first control unit 1, whether or not the constant cruising speed control is in progress (step 703). If the vehicle is not moving at a constant speed, the CPU 6b obtains the angle of the target second throttle valve (TASM), based on the relationship between TAM and TASM, according to mode (B) (step 704).

When the mode selector 14 is ON (mode A) in step 702, the CPU 6b obtains the target angle of the second throttle valve (TASM), based on the relationship between TAM and TASM, according to mode (A) (step 709).

When it is determined at step 703 that the constant cruising speed control mode in progress, the CPU 6b determines if the actuator manipulation amount (An) is below (SAn−α) (step 706). "SAn" represents the actuator manipulation amount necessary for the vehicle to travel on a horizontal road surface at a constant speed, and "α" is the offset value for adjusting the detection timing of over-riding. The relationship between the vehicle speed and the manipulation amount (SAn) has only to be experimentally obtained, and the data has only to be stored in the ROM 1d of the first control unit 1.

There are two cases where the actuator manipulation amount (An) decreases until (An<SAn−α) is satisfied. The first case is where the vehicle speed increases due to over-riding, and the second case is where the vehicle speed naturally increases when the vehicle descends a slope. When the vehicle is descending a slope at a constant speed, however, it will not be accelerated due to the constant cruising speed control operation. In this respect, the CPU 6b determines if the vehicle acceleration (AC) is greater than a predetermined acceleration (β) (step 707), and determines that the vehicle can be in the over-riding mode if AC is greater than β. If the acceleration (AC) is equal to or less than the acceleration (β), it is determined that the vehicle is descending a slope. The acceleration (β) should be set to the proper value, in view of the accuracy of the determination of the over-riding condition, and the stability of the throttle valve control.

When AC is greater than β, the CPU 6b determines if the status of the idling contact signal is ON (step 708). This decision is made to distinguish the over-riding condition from the case where the air intake passage at the first throttle valve is completely closed by the actuator, during descent the steep slope, so that the constant cruising speed control is no longer possible. In the over-riding mode, the status of the idling contact signal is always OFF.

When the three conditions at steps 706, 707 and 708 are satisfied, the CPU 6b concludes that the vehicle is in the over-riding mode, and obtains the target angle of the second throttle valve (TASM), according to mode B (step 704). Otherwise, the CPU 6b concludes that the vehicle is not in the over-riding mode, and obtains the target angle (TASM) according to mode (A) (step 709).

Thereafter, the CPU 6b controls the second throttle valve 11 through the throttle motor 7, in such a way that the second throttle valve angle becomes the target angle (TASM) obtained at step 704 or step 709 (step 705).

As described above, regardless of the mode (A or B) which has been selected for normal cruising (other than the constant speed cruising), the control mode of the second throttle valve is always to be set to the mode (A) for the constant cruising speed control mode. If over-riding is detected by the above-described second scheme when the mode (B) is selected by the driver, the control mode of the second throttle valve is changed to mode (B), even in the constant cruising speed control mode. In other words, when the driver greatly thrusts the accelerator pedal during the constant cruising speed control operation, the control on the throttle valve is carried out in mode (B), which the driver has intended originally, not in mode (A) which has been selected for constant cruising speed control. The driver can therefore experience the acceleration feeling in the over-riding mode, without feeling startled.

The fourth embodiment, like the first embodiment, prevents the vehicle speed from overshooting or undershooting at the time the vehicle speed is set.

Table 1 below shows the change in the throttle valve control mode in the engine control apparatuses according to the third and fourth embodiments. In Table 1, the control mode at the over-riding condition matches the control mode during normal cruising (i.e. the mode selected by the mode selector 14).

TABLE 1

| Normal cruising (set by mode selector) | Constant speed control | Over-riding |
| --- | --- | --- |
| Mode A | Mode A | Mode A |
| Mode B | Mode A | Mode B |
| Mode A | Mode B | Mode A |

TABLE 1-continued

| Normal cruising (set by mode selector) | Constant speed control | Over-riding |
|---|---|---|
| Mode B | Mode B | Mode B |

Fifth Embodiment

Figure 16:
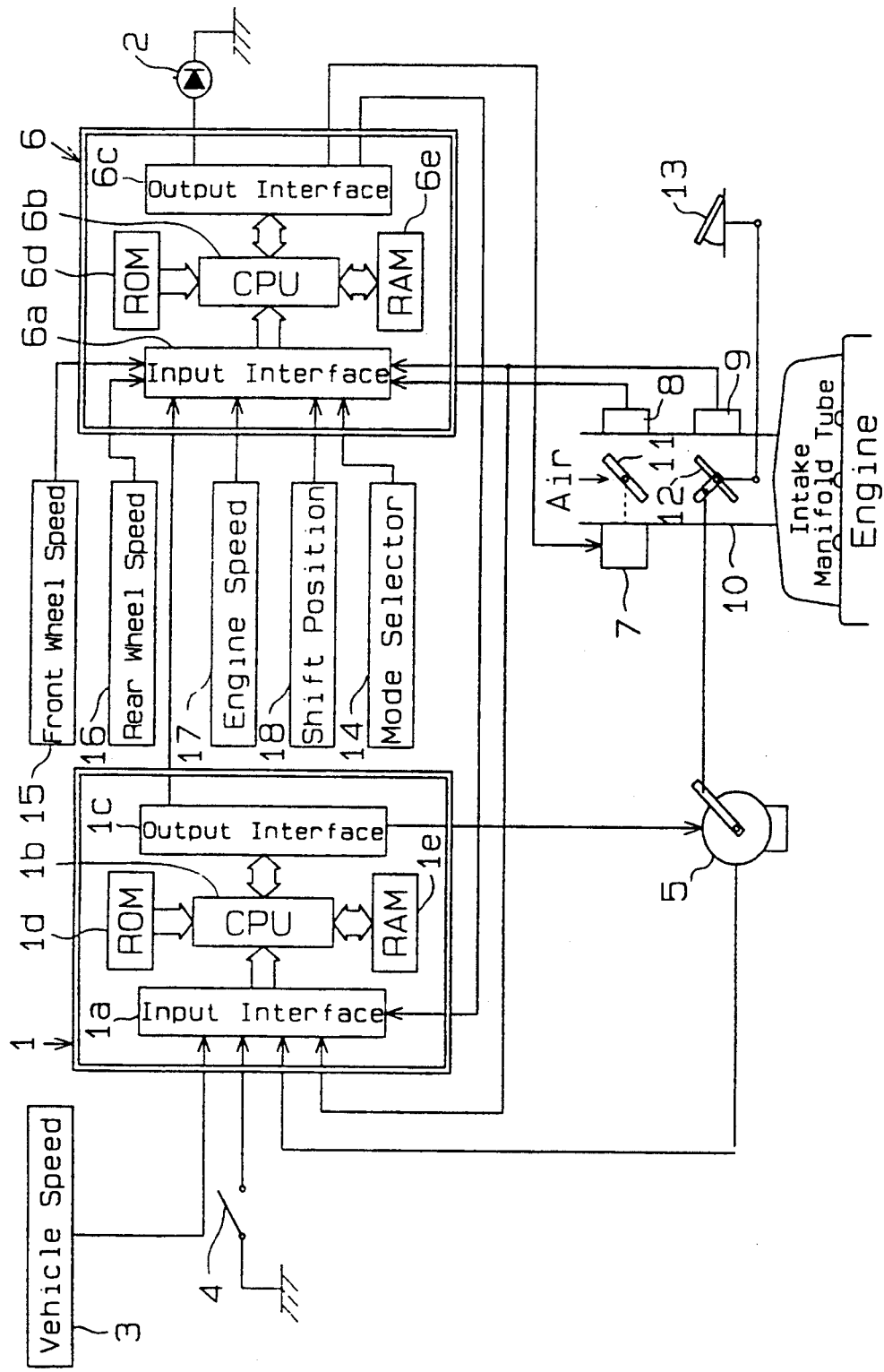

Referring now to FIGS. 16 through 20, the fifth embodiment of the present invention will be described. FIG. 16 illustrates the control apparatus according to this embodiment. The structure is substantially the same as that of the first embodiment, except that the output interface circuit 6c of the second control unit 6 is connected to the input interface circuit 1a of the first control unit 1, so that the first control unit 1 can access information from the second control unit 6. The first valve angle sensor 9 outputs an idling contact signal to the first control unit 1. The idling contact signal becomes enabled (ON) when the first throttle valve 12 is completely closed, and becomes disabled (OFF) otherwise.

The second control unit 6 of the fifth embodiment, which controls the engine power, computes the slip ratio of the drive wheel based on the rotational speeds of the front and rear wheels, and, based on the slip ratio, it determines whether the road has a high or low friction factor ($\mu$). For instance, when the computed slip ratio is proper and the road friction factor ($\mu$) is thus considered high, it is basically unnecessary to control the engine power to prevent the drive wheel from slipping. At this time, the angle of the second throttle valve 11 is controlled according to a high-$\mu$ road control mode AA. The mode AA achieves the characteristic indicated by the dashed line in FIG. 17, which shows that the opening amount of the air-intake passage at the first throttle valve 12 (or the first throttle valve angle) is proportional to the engine torque (Q)

Figure 17:
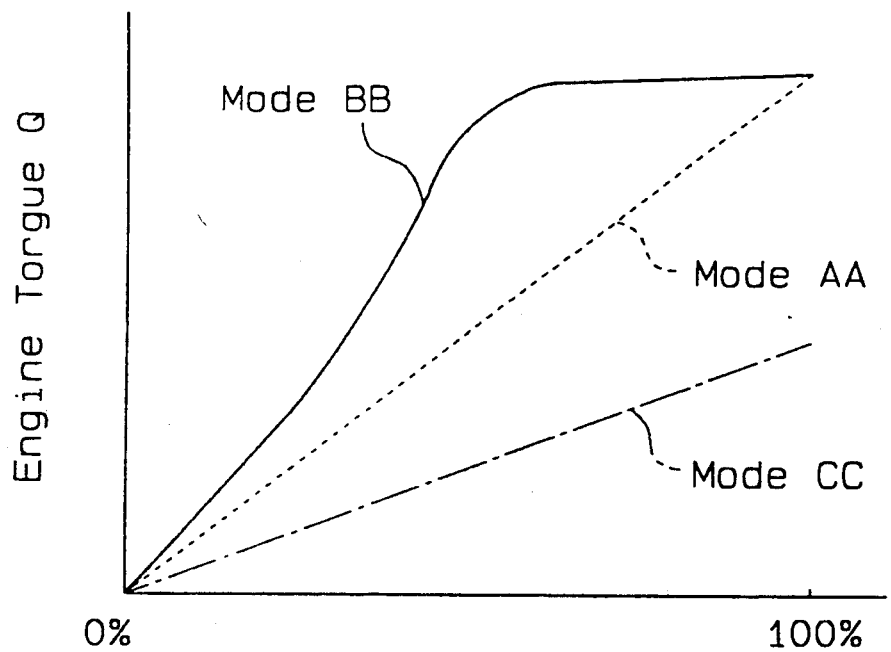

For reference purpose, the solid line (mode AA) in FIG. 17 shows the relationship between the passage opening amount at the first throttle valve and the engine torque, when the second throttle valve 11 is fully opened (i.e. when the passage is fully opened at the second throttle valve).

When the computed slip ratio is high and the road friction factor ($\mu$) is thus considered low, the second throttle valve angle is set smaller than the angle of the first throttle valve, so as to make the total throttle equivalent angles smaller, in order to prevent the drive wheel from slipping. In other words, the angle of the second throttle valve 11 is controlled according to a low-$\mu$ road control mode CC, which achieves the characteristic indicated by the broken line in FIG. 17. As a result, even when the driver thrusts the accelerator pedal 13, as in the case of a high-$\mu$ road surface, the engine torque in the low-$\mu$ road control mode is suppressed more than in the high-$\mu$ road control mode.

The angles of the second throttle valve with respect to the angles of first throttle valve in the high-$\mu$ and low-$\mu$ control modes are stored in the ROM 6d of the second control unit 6. The second throttle valve may be controlled in accordance with the setting of the mode selector 14 by the driver, instead of the decision based on the road friction factor.

Figure 18:
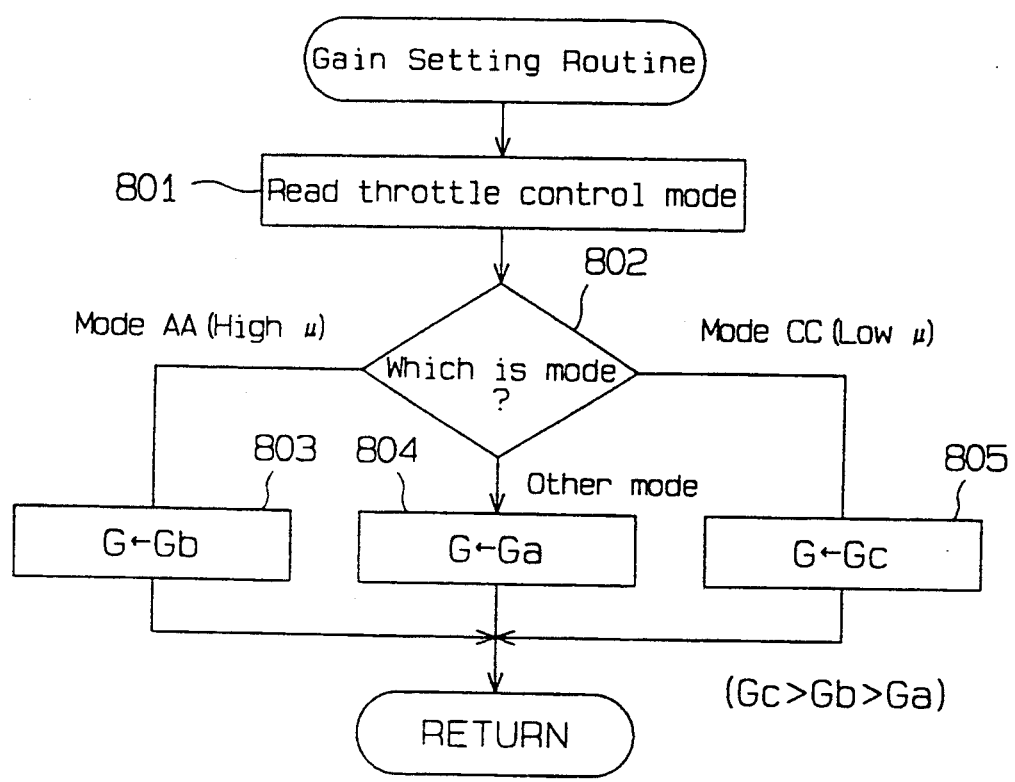
Figure 19:
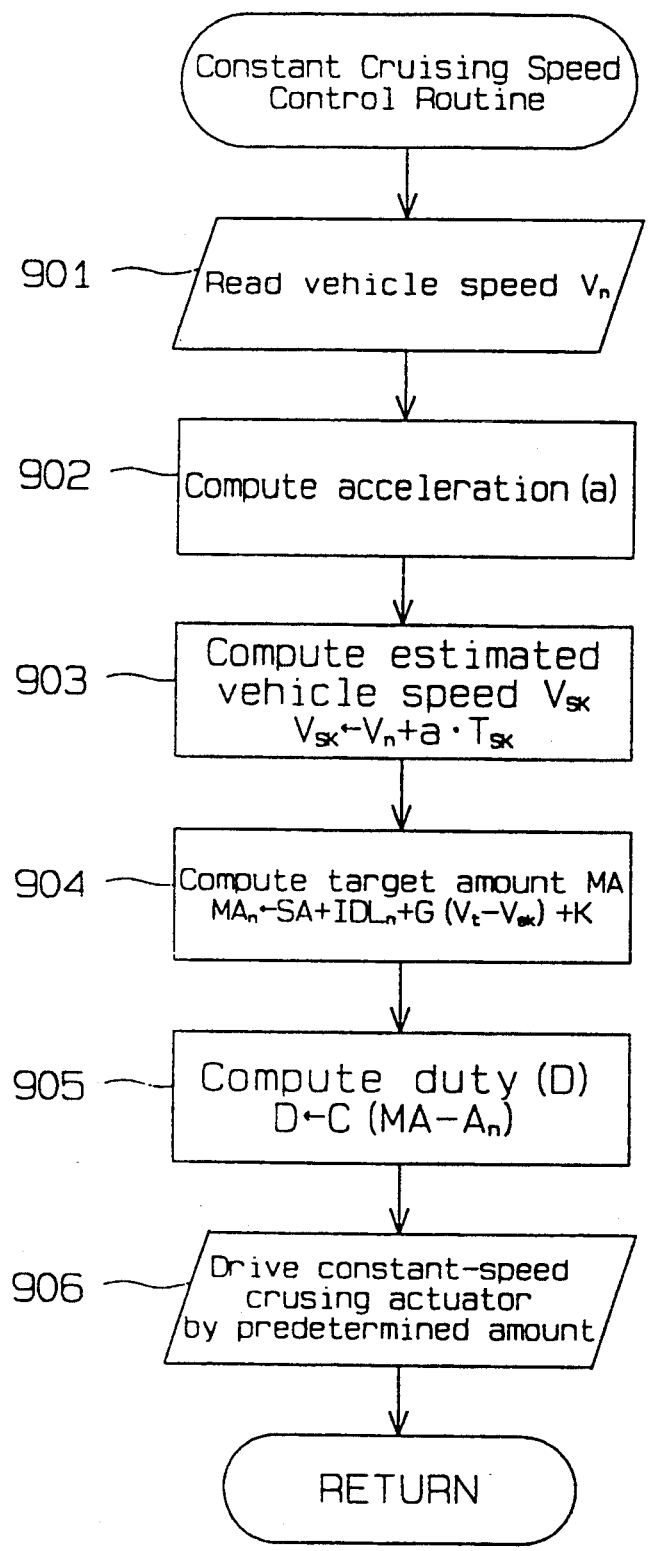

The first control unit 1 periodically executes the sequences of the processes according to the interrupt routines shown in FIGS. 18 and 19, to control the angle of the first throttle valve (or the passage opening amount at the first throttle valve 12).

FIG. 18 illustrates an interrupt routine for setting the gain. In this routine, the CPU 1b reads a signal from the output interface circuit 6c to the input interface circuit 1a, and which is associated with the control mode of the throttle valve (step 801). The CPU 1b determines the control mode in which the control apparatus is currently operating (step 802). The decision could lead to three separate results: high-$\mu$ control mode AA, low-$\mu$ control mode CC, and other mode (which means that no throttle valve control is performed).

The CPU 1b sets the gain (G) to the proper value. The gain (G) is a parameter that determines the manipulation amount of the actuator 5. The gain G is set to a predetermined value Ga in the other mode (step 804). In the high-$\mu$ control mode AA, the gain (G) is set to a predetermined value Gb (Gb greater than Ga) (step 803). In the low-$\mu$ road control mode CC, the gain (G) is set to a predetermined value Gc (Gc is greater than Gb) (step 805). In the fifth embodiment, the gain Gc is about twice the gain Gb.

When the angle of the second throttle valve 11 is controlled in the throttle valve control mode corresponding to the road friction factor ($\mu$), the first control unit 1 sets the gain (G) to the proper value for the selected control mode.

FIG. 19 illustrates an interrupt routine for constant speed cruising control mode according to this embodiment. The CPU 1b periodically executes this interrupt routine, at a predetermined interval of time (TM), which is independent of the gain setting routine. In accordance with the routine in FIG. 19, the CPU 1b reads the vehicle speed (Vn) from the vehicle speed sensor 3 first (step 901), and computes the vehicle acceleration (a) based on the vehicle speed (Vn) (step 902). The acceleration (a) is generally acquired by differentiating the vehicle speed (Vn). However, in this embodiment, acceleration is computed based on the interval time (TM) between two interrupts and the change in the vehicle speed during that interval.

Then, the CPU 1b computes an estimated vehicle speed (Vsk) according to an equation (4) (step 903). The estimated vehicle speed (Vsk) means an estimated value for the vehicle speed that the current vehicle speed (Vn) will reach after time Tsk.

$$Vsk = Vn + a \cdot Tsk \tag{4}$$

Then, the CPU 1b acquires the target manipulation amount (MAn) of the actuator 5 from equation (5) (step 904).

$$MAn = SA + IDLn + G(Vt - Vsk) + K \tag{5}$$

In the foregoing equation (5), "SA" is the actuator manipulation amount required for the vehicle to travel on a horizontal road surface at a constant speed, and is the initial manipulation amount in the constant cruising speed control mode. "IDLn" is the play amount of the actuator 5 at the time of its rotation, during the interval between the point at which the first throttle valve 12 is at the angular position of zero (i.e. the air-intake passage is completely closed) and the point when the first throttle valve 12 starts moving. "Vt" is the target vehicle speed. "(Vt−Vsk)" is the difference in the vehicle speed after time Tsk. "K" is an auxiliary coefficient.

The real vehicle speed (Vn) may be used in equation (5), instead of the estimated vehicle speed (Vsk).

The CPU 1b computes the duty (D) of a pulse signal to the actuator 5 from equation (6) below.

$$D = C'(MAn - An) \qquad (6)$$

where "An" is the current actuator manipulation amount, and "C'" is a compensation coefficient.

The CPU 1b outputs a control signal of the duty (D) to the actuator 5 via the output interface circuit 1c, to drive the actuator 5 by a predetermined amount (step 906). The duty (D) therefore corresponds to the manipulation amount of the actuator 5. When the duty (D) is a negative value, the actuator 5 should be driven to reduce the angle of the throttle valve 12. At this time, the CPU 1b outputs a control signal of opposite polarity to the one that is given for the forward rotation of the actuator 5, for causing the actuator 5 to rotate in the reverse direction.

Figure 20:
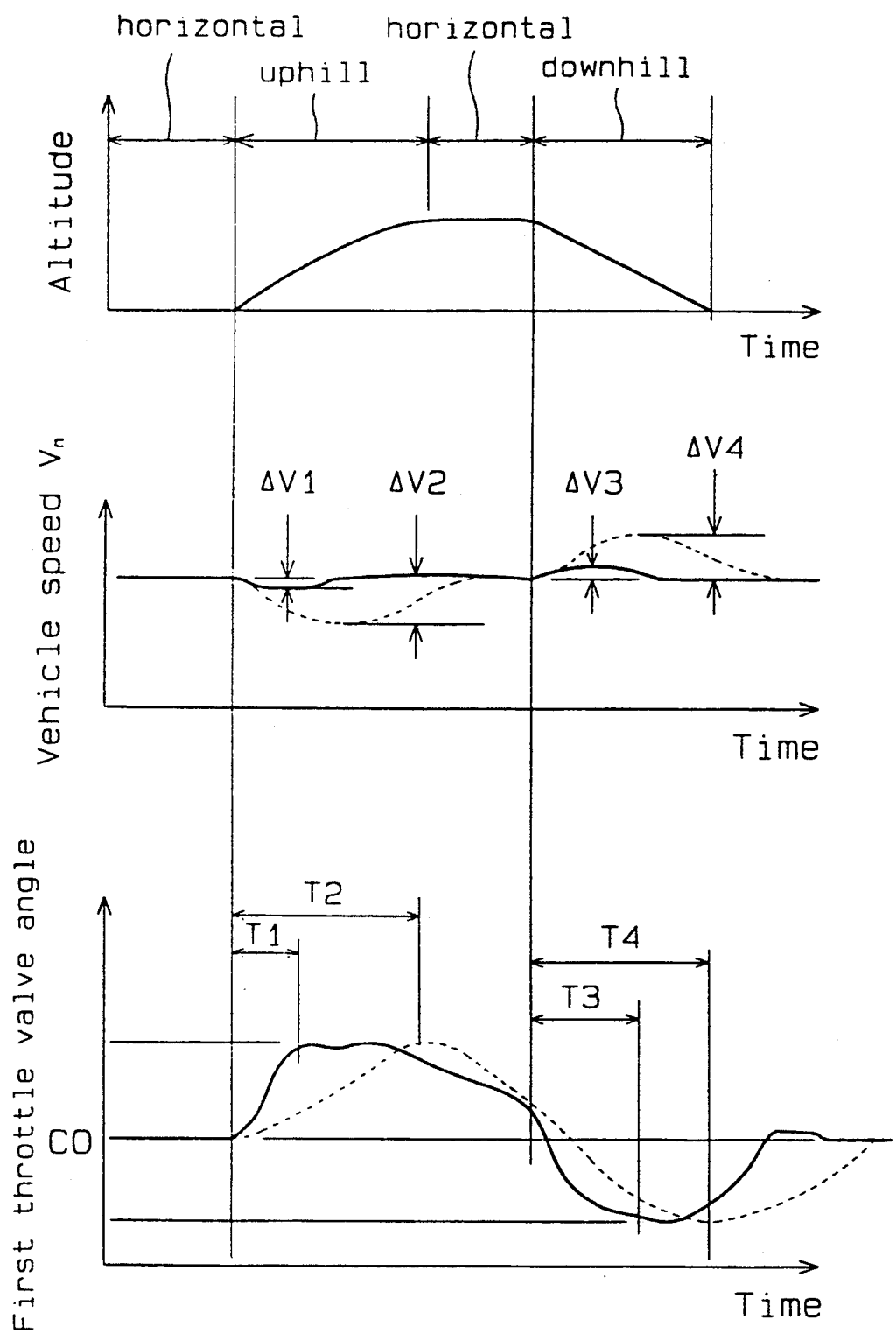

As described above, the first control unit 1 sets the gain (G) for the constant cruising speed control mode, in accordance with the throttle control mode in which the second control unit 6 is operating. In the low-$\mu$ control mode CC where a change in the engine torque is relatively small to a change in the angle of the first throttle valve, the first control unit 1 sets that gain to Gc, which is greater than the gain of the high-$\mu$ control mode AA. Consequently, when the vehicle starts going uphill, the angle of the first throttle valve will increase immediately (within time T1 at most), as shown in FIG. 20. Thus, a drop of the vehicle speed (Vn) is reduced down to a tiny range of ΔV1. When the vehicle starts going downhill, the angle of the first throttle valve will decrease immediately (within time T3 at most). The range of the change in the vehicle speed (Vn) therefore becomes as small as ΔV3. The conventional control apparatuses, do not change the gain to a greater value, even when the throttle control mode is the low-$\mu$ control mode. Even with a control output of duty (D) given to the actuator 5, a change in the engine torque remains small with respect to a change in the angle of the first throttle valve, in the conventional control apparatuses as shown in FIG. 17. In this case, the angle of the first throttle valve gently changes, as indicated by the dashed line in FIG. 20. For the angle of the first throttle valve to reach the predetermined level, the conventional apparatus requires a time T2 for an uphill trip, and an additional time T4 for a downhill. In addition, since a change in first throttle valve angle in relation to the control output of duty (D) is small in the conventional apparatus, a change in the vehicle speed (ΔV2, ΔV4) becomes greater than that in this embodiment where the gain (G) is set again to a greater value Gc.

According to this embodiment, at the time of computing the duty of the control output (manipulation amount) from the equation (6), the gain (G) is selected in accordance with the throttle control mode. Regardless of the throttle control mode, therefore, the time required for achieving a change in the throttle valve angle is shortened. Further, occurrence of hunting of the engine will be prevented.

Furthermore, the constant cruising speed control mode is properly conducted regardless of the control mode. The throttle valve control mode according to the road conditions is maintained even in the over-riding mode. Therefore, even when the vehicle is moving on a low-$\mu$, the engine torque will not become larger than needed, thus preventing wheel slipping. The gain has only to be set for each vehicle type, based on the characteristics of that vehicle and the throttle control modes. The control apparatus may be designed to learn the optimal value of the gain during control.

Sixth Embodiment

The sixth embodiment of the present invention will now be described referring to FIG. 21. The structure of a control apparatus according to the sixth embodiment is substantially the same as that of the fifth embodiment. In the sixth embodiment, the first control unit 1 periodically executes an interrupt routine for setting an auxiliary coefficient (see FIG. 21), instead of the gain setting routine in FIG. 18.

Figure 21:
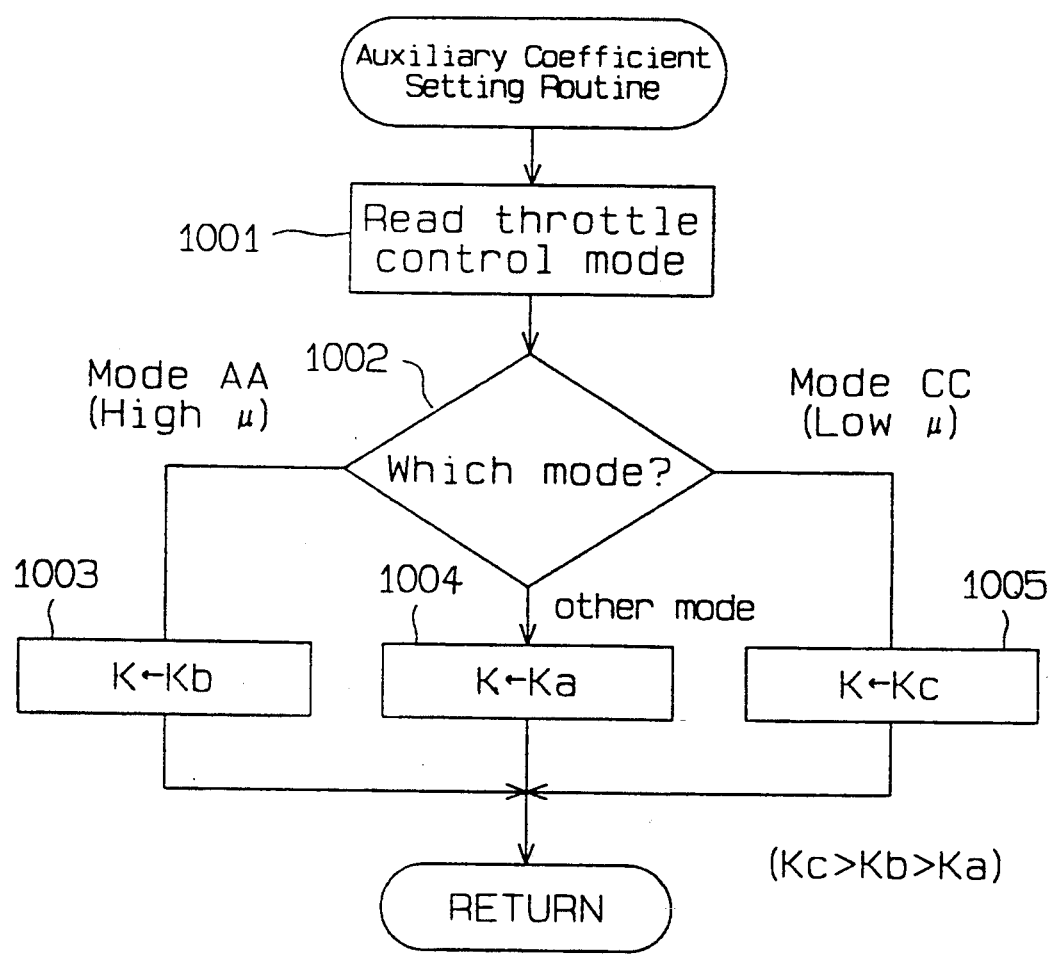
FIG. 21 is a flowchart illustrating an auxiliary coefficient setting routine for use in an engine control apparatus according to a sixth embodiment of the present invention.

In the routine of FIG. 21, the CPU 1b reads a signal, which is inputted from the output interface circuit 6c to the input interface circuit 1a, and which is associated with the control mode of the throttle valve (step 1001). The CPU 1b determines the control mode in which the control apparatus is currently operating (step 1002). The decision could lead to three separate results: high-$\mu$ control mode AA, low-$\mu$ control mode CC, and other mode (which means that no throttle valve control is performed).

The CPU 1b sets an auxiliary coefficient (K) to the proper value. The coefficient (K) is a parameter that determines the manipulation amount of the actuator 5. The coefficient (K) is set to a predetermined value Ka in the other mode (step 1004). In high-$\mu$ control mode AA, the coefficient (K) is set to a predetermined value Kb (Kb larger than Ka) (step 1003). In the low-$\mu$ control mode CC, the coefficient (K) is set to a predetermined value Kc (Kc being greater than Kb) (step 1005).

When the second throttle valve angle is controlled in the throttle valve control mode corresponding to the road friction factor ($\beta$), the first control unit 1 sets the auxiliary coefficient (K) to the proper value for the selected control mode. This increases the duty (D) corresponding to the actuator manipulation amount, in the same manner as the gain (G) causes an increase in the duty (D), in the fifth embodiment. When the vehicle speed changes due to the inclination of the road, therefore, a change in the vehicle speed can be reduced suppressed to a small level, as in the fifth embodiment. The real vehicle speed will return to the target vehicle speed quickly.

Although the auxiliary coefficient (K) is set again to the proper value according to the control mode in this embodiment, the initial manipulation amount (SA) in equation (5) or the compensation coefficient (C') in equation (6) may be set again to increase the duty (D). Alternatively, the target vehicle speed (Vt) may temporarily be set to a larger value.

In the fifth and sixth embodiments, the relationship between the actuator manipulation amount and the engine torque (i.e., the control characteristic) is affected by the angle of the second throttle valve. This variation of the control characteristic can also be accomplished by means ignition control of the engine to stop some of the cylinders, or by the ignition control to shift the ignition timings of the individual cylinders. In the former ignition control to stop some cylinders, a change in the engine power is gentle with respect to the manipulated amount of the throttle valve, so that the characteristic of the constant speed cruising control can be improved by changing the duty (D) to a greater value.

A linkless throttle structure is known which controls the throttle valve angle based on the thrust amount of the accelerator pedal. This linkless throttle structure acquires the manipulation amount of the throttle valve from the thrust amount of the accelerator pedal detected by a sensor, referring to a data table. If several types of data tables are prepared in advance, a plurality of throttle control modes can be accomplished even with a single throttle valve. In this case, by conducting cruising control according to the thrust amount of the accelerator pedal, the vehicle speed can smoothly respond to the variations in driving conditions, even in the low-$\mu$ control mode, as is described in the fifth and sixth embodiments. Therefore, the fifth and sixth embodiments of the present invention can be applied to the linkless throttle structure, and will still have the same advantages.

Although only six embodiments of the present invention have been described herein, it should be apparent to those skilled in the art that the present invention may be embodied in many other specific forms without departing from the spirit or scope of the invention. Particularly, it should be understood that the present invention may be worked out in the following modes.

Although the first and second control units 1 and 6 are separately provided in the first to sixth embodiments, those units may be designed into a single control unit having only one CPU. In this case, the single CPU would run a program for the constant cruising speed control mode, and a program for the engine power control, in time sharing manner.

The mechanism for controlling the flow rate of air along the air-intake passage 10 is not limited to a throttle valve, and any other type of flow regulator may be used instead. The actuator 5 is not limited to a motor, but may be a rotary solenoid, linear solenoid or an actuator that is driven by air pressure.

It should be understood that the control procedures of the fifth and sixth embodiments can be used in any of the first to fourth embodiments.

Therefore, the present examples and embodiment are to be considered as illustrative and not restrictive and the invention is not to be limited to the details given herein, but may be modified within the scope of the appended claims.

What is claimed is:

1. A control apparatus for use in a vehicle, to control a constant cruising speed of the vehicle, the vehicle including an engine provided with an intake passage and a driver-controlled accelerator mechanism, the control apparatus comprising:

first valve means provided along the intake passage and forming a first variable angle therewith, said first angle being changeable by means of the accelerator mechanism;

second valve means provided in series with said first valve means along the intake passage, the second valve means forming a second variable angle with the intake passage;

first actuator means for controlling said first angle independently of the accelerator mechanism;

second actuator means for controlling said second angle;

speed sensing means for detecting the actual vehicle speed;

cruise control sensing means for detecting the beginning and end of a constant cruising speed control mode;

target speed setting means for setting a vehicle target speed during said constant cruising speed control mode;

control means for controlling said first actuator means to maintain the actual vehicle speed at said target speed during said constant cruising speed control mode;

angle sensing means for detecting said first angle;

mode storage means for storing information relating to a plurality of control modes for use in controlling said second valve means, each of said control modes defining a target value for said second angle as a function of said first angle;

mode selecting means for selecting one of said control modes;

said control means further controlling said second actuator means to cause said second angle to reach said target value according to the selected control mode; and regulator means for regulating said control means during said constant cruising speed control mode, in order to control said first valve means according to a control mode which is specified for said constant cruising speed control mode and which is selected from said stored control modes.

2. The control apparatus according to claim 1, wherein said control specified for said constant cruising speed control mode is predetermined, and is not subject to the mode selection of said mode selecting means.

3. The control apparatus according to claim 1, wherein said regulator means is connected to said mode selecting means, and regulates said control means, in such a way that said control mode specified for said constant cruising speed control mode is similar to the control mode selected by said mode selecting means.

4. The control apparatus according to claim 2,
wherein said control means includes first control means and second control means;
wherein said first control means controls said first actuator means, and said second control means controls said second actuator means; and
wherein when said constant cruising speed control mode by said first control means is in progress, said regulator means regulates said second control means, in such a way that said second control means controls said second actuator means in said predetermined control mode specified for said constant cruising speed control mode, regardless of the control mode selected by said mode selecting means.

5. The control apparatus according to claim 4, wherein said regulator means includes:

over-ride detecting means for detecting an over-riding condition where said first angle according to the speed accelerator mechanism exceeds said first angle according to said first actuator means, during said constant cruising speed control mode; and mode changing means for changing said control mode to be followed by said second control means, during constant cruising speed control mode, whereby when said cruise control sensing means detects the beginning of said constant cruising speed control mode, said mode changing means changes said control mode to be followed by said second control means to said control mode specified for said constant cruising speed control mode, and whereby when said over-ride detecting means detects an over-riding condition, said mode changing means sets said control mode to be followed by said second control means to said control mode which is selected by said mode selecting means.

6. The control apparatus according to claim 4, wherein said second control means further comprises:
- wheel rotational speed sensing means for detecting a rotational speed of a wheel of the vehicle; and
- slipperiness determining means for computing a slip ratio of said wheel based on said rotational speed, in order to determine the slipperiness of a road;
- wherein said mode storage means stores a high-μ control mode to be used when said slip ratio is within an acceptable range, and a low-μ control mode to be used when said slip ratio is improperly high;
- wherein the engine generates a torque, such that said engine torque in said low-μ control mode is set lower than that in said high-μ control mode; and
- wherein said first control means further comprises:
- means for computing a target manipulation amount (MAn) of said first actuator means in accordance with a function including the following parameters: a gain (G); a vehicle target speed (Vt); an auxiliary coefficient (K); and a reference manipulation amount (SA) of said first actuator means corresponding to said first angle needed for the vehicle to travel on a horizontal road at said target speed; and
- value setting means for setting a value of at least one the following parameter: said gain (G); said target speed (Vt); said auxiliary coefficient (K); and said reference manipulation amount (SA), in accordance with said control mode followed by said second control means.

7. The control apparatus according to claim 6, wherein said value of said parameter set by said value setting means, when said second control means is in said low-μ control mode, is greater than that of the parameter set by said value setting means when said second control means is in said high-μ control mode.

8. A control apparatus for use in a vehicle, to control a constant cruising speed of the vehicle, the vehicle including an engine provided with an intake passage and a driver-controlled accelerator mechanism, the control apparatus comprising:
- first valve means provided along the intake passage and forming a first variable angle therewith, said first angle being changeable by means of the accelerator mechanism;
- second valve means provided in series with said first valve means along the intake passage, the second valve means forming a second variable angle with the intake passage;
- first actuator means for controlling said first angle independently of the accelerator mechanism;
- second actuator means for controlling said second angle;
- speed sensing means for detecting the actual vehicle speed;
- cruise control sensing means for detecting the beginning and end of a constant cruising speed control mode;
- target speed setting means for setting a vehicle target speed during said constant cruising speed control mode;
- first control means for controlling said first actuator means to maintain the actual vehicle speed at said target speed during said constant cruising speed control mode;
- angle sensing means for detecting said first angle;
- mode storage means for storing information relating to a plurality of control modes for use in controlling said second valve means, each of said control modes defining a target value for said second angle as a function of said first angle;
- mode selecting means for selecting one of said control modes;
- second control means for controlling said second actuator means to cause said second angle to reach said target value according to the selected control mode;
- over-ride detecting means for detecting an over-riding condition wherein said first angle according to the accelerator mechanism exceeds said first angle according to said first actuator means, during said constant cruising speed control mode; and
- mode changing means for changing said control mode to be followed by said second control means during said constant cruising speed control mode, whereby when said cruise control sensing means detects the beginning of said constant cruising speed control mode, said mode changing means changes said control mode to be followed by said second control means to said control mode specified for said constant cruising speed control mode, and whereby when said over-ride detecting means detects said over-riding condition, said mode changing mode sets said control mode to be followed by said second control means to said control mode which is selected by said mode selecting means.

9. The control apparatus according to claim 8, further comprising:
- idling contact detecting means for detecting whether or not the intake passage is completely closed by said first valve means, and for outputting an idling contact signal indicative of an ON state when the intake passage is completely closed by said first valve means; and
- wherein said over-ride detecting means determines an over-riding condition when the following two conditions are met:
  a) a manipulation amount (An) of said first valve means adjusted by said first actuator means is smaller than a manipulation amount (IDLn) of said first valve means by which an opening degree of the intake passage at said first valve means is not zero; and
  b) said idling contact signal is in an OFF state.

10. The control apparatus according to claim 8, further comprising:
- idling contact detecting means for detecting whether or not the intake passage is completely closed by said first valve means, and for outputting an idling contact signal indicative of an ON state when the intake passage is completely closed by said first valve means;
- acceleration detecting means for computing the acceleration of the vehicle, based on the vehicle speed detected by said speed sensing means; and
- wherein said over-ride detecting means determines an over-riding condition when the following three conditions are met:
  a) a manipulation amount (An) of said first valve means adjusted by said first actuator means is smaller than a value (SAn−α) obtained by subtracting an over-riding detection offset value (α) from a manipulation amount (SAn) of said first valve means needed for the vehicle to travel on a horizontal road surface at a target speed;

b) the vehicle acceleration (AC) is greater than a predetermined acceleration (β) which does not occur in said constant cruising speed control mode; and c) said idling contact signal is in an OFF state.

11. A control apparatus for use in a vehicle, to control a constant cruising speed of the vehicle, the vehicle including an engine provided with an intake passage and a driver-controlled accelerator mechanism, the control apparatus comprising:

first valve means provided along the intake passage and forming a first variable angle therewith, said first angle being changeable by means of the accelerator mechanism;

second valve means provided in series with said first valve means along the intake passage, the second valve means forming a second variable angle with the intake passage;

first actuator means for controlling said first angle independently of the accelerator mechanism;

second actuator means for controlling said second angle;

speed sensing means for detecting the actual vehicle speed;

cruise control sensing means for detecting the beginning and end of a constant cruising speed control mode;

target speed setting means for setting a vehicle target speed during said constant cruising speed control mode;

first control means for controlling said first actuator means to maintain the actual vehicle speed at said target speed during said constant cruising speed control mode;

angle sensing means for detecting said first angle;

mode storage means for storing information relating to a plurality of control modes for use in controlling said second valve means, each of said control modes defining a target value for said second angle as a function of said first angle;

mode selecting means for selecting one of said control modes;

second control means for controlling said second actuator means to cause said second angle to reach said target value according to the selected control mode;

regulator means for regulating said first control means during said constant cruising speed control mode in order to control said first valve means in accordance with said selected control mode selecting means when said cruise control sensing means detects the beginning of said constant cruising speed control mode.

* * * * *

UNITED STATES PATENT AND TRADEMARK OFFICE
CERTIFICATE OF CORRECTION

PATENT NO. : 5,394,954
DATED : March 7, 1995
INVENTOR(S) : Kenji Tashiro, et al

It is certified that error appears in the above-indentified patent and that said Letters Patent is hereby corrected as shown below:

| Column | Line | |
|---|---|---|
| 1 | 12 | Change "regulate" to --regulates--. |
| 1 | 37 | After "gradually" delete "to". |
| 1 | 60 | Change "under shooting" to --undershooting"--. |
| 2 | 57 | Change "valve" to --value--. |
| 3 | 14 | Change "acquire" to --reach--. |
| 4 | 10 | Change "valve" to --value--. |
| 4 | 38 | Before "engine" change "a" to --an--. |
| 7 | 12 | After "parameters;" insert --and--. |
| 7 | 29 | After "series" change "of" to --in--. |

UNITED STATES PATENT AND TRADEMARK OFFICE
CERTIFICATE OF CORRECTION

PATENT NO. : 5,394,954
DATED : March 7, 1995
INVENTOR(S) : Kenji Tashiro, et al

It is certified that error appears in the above-indentified patent and that said Letters Patent is hereby corrected as shown below:

| Column | Line | |
|---|---|---|
| 7 | 35 | After "motor 7" insert --,--. |
| 8 | 65 | Change " "dv/dt" " to --"(dv/dt)"--. |
| 11 | 26 | After "speed" change "at" to --as--. |
| 11 | 55 | After "is" insert --set--. |
| 14 | 44 | After "be" delete "as". |
| 16 | 28 | Indent for new paragraph. |
| 17 | 15 | After "vehicle" change "were" to --was--. |
| 18 | 19 | After "descent" insert --of--. |
| 21 | 48 | After "downhill" insert --trip--. |

UNITED STATES PATENT AND TRADEMARK OFFICE
CERTIFICATE OF CORRECTION

PATENT NO. : 5,394,954
DATED : March 7, 1995
INVENTOR(S) : Kenji Tashiro, et al

It is certified that error appears in the above-indentified patent and that said Letters Patent is hereby corrected as shown below:

| Column | Line | |
|---|---|---|
| 22 | 37 | Change "(β)" to --(μ)--. |
| 22 | 45 | After "reduced" insert --or--. |
| 22 | 61 | After "means" insert --of--. |
| 24 | 27 | After "control" insert --mode--. |
| 25 | 30 | Change "parameter:" to --parameters:--. |

Signed and Sealed this

Seventeenth Day of October, 1995

Attest:

BRUCE LEHMAN

*Attesting Officer*     Commissioner of Patents and Trademarks